(12) United States Patent
Shinagawa et al.

(10) Patent No.: US 12,028,488 B2
(45) Date of Patent: Jul. 2, 2024

(54) RECORDING DEVICE AND CONTROL METHOD TO PERFORM MAINTENANCE, TRANSPORT CORRECTION, OR DISCHARGE CORRECTION BASED UPON A CAPTURED IMAGE

(71) Applicant: SEIKO EPSON CORPORATION, Tokyo (JP)

(72) Inventors: Hiroki Shinagawa, Shiojiri (JP); Kazumasa Harada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/158,045

(22) Filed: Jan. 23, 2023

(65) Prior Publication Data

US 2023/0239413 A1  Jul. 27, 2023

(30) Foreign Application Priority Data

Jan. 25, 2022  (JP) ................ 2022-009284

(51) Int. Cl.
*H04N 1/00* (2006.01)
*B41J 29/393* (2006.01)
(Continued)

(52) U.S. Cl.
CPC .......... *H04N 1/0005* (2013.01); *B41J 29/393* (2013.01); *H04N 1/00015* (2013.01); *H04N 1/00045* (2013.01); *H04N 1/00074* (2013.01); *H04N 1/00084* (2013.01); *H04N 1/00092* (2013.01); *H04N 1/32635* (2013.01);
(Continued)

(58) Field of Classification Search
CPC ............ H04N 1/0005; H04N 1/00015; H04N 1/00045; H04N 1/00074; H04N 1/00084; H04N 1/00092; H04N 1/32635; H04N 1/32651; H04N 1/4015; B41J 2/165–16588; B41J 2002/16502–16597;
(Continued)

(56) References Cited

U.S. PATENT DOCUMENTS 8,029,085 B2 * 10/2011 Yoshida ................ B41J 29/393
  347/15
9,031,431 B2 * 5/2015 Shoji .................. G03G 15/5062
  356/402

(Continued)

FOREIGN PATENT DOCUMENTS

JP  2018-174519 A  11/2018

*Primary Examiner* — Scott A Rogers
(74) *Attorney, Agent, or Firm* — WORKMAN NYDEGGER

(57) ABSTRACT

The recording device includes an upstream transport roller pair capable of transporting a medium, a recording head configured to record an image by discharging ink at a predetermined timing on the medium transported downstream in a D1 direction by a predetermined transport amount by the upstream transport roller pair while moving in a Y-axis direction intersecting the D1 direction, an image capturing unit configured to read the image recorded on the medium by the recording head, and a control unit, wherein the control unit has a function of performing maintenance for a discharge failure of the ink, a correction of the transport amount, and a correction of the discharge timing of the ink based on the reading result of the image read by the image capturing unit.

11 Claims, 21 Drawing Sheets

(51) Int. Cl.
*H04N 1/32* (2006.01)
*H04N 1/401* (2006.01)

(52) U.S. Cl.
CPC ....... *H04N 1/32651* (2013.01); *H04N 1/4015* (2013.01); *B41J 2029/3935* (2013.01)

(58) Field of Classification Search
CPC ...... B41J 2/04573; B41J 2/115; B41J 29/393; B41J 2029/3935
See application file for complete search history.

(56) References Cited

U.S. PATENT DOCUMENTS

| | | | |
|---|---|---|---|
| 9,152,890 B2 * | 10/2015 | Ukishima | H04N 1/6041 |
| 11,554,582 B2 * | 1/2023 | Kobayashi | B41J 2/04586 |
| 11,718,089 B2 * | 8/2023 | Murai | B41J 2/04573 |
| | | | 347/5 |
| 11,718,091 B2 * | 8/2023 | Mikashima | H04N 1/0057 |
| | | | 347/14 |
| 2018/0281430 A1 | 10/2018 | Ohta et al. | |

* cited by examiner

RECORDING DEVICE AND CONTROL METHOD TO PERFORM MAINTENANCE, TRANSPORT CORRECTION, OR DISCHARGE CORRECTION BASED UPON A CAPTURED IMAGE

The present application is based on, and claims priority from JP Application Serial Number 2022-009284, filed Jan. 25, 2022, the disclosure of which is hereby incorporated by reference herein in its entirety.

BACKGROUND

1. Technical Field

The present disclosure relates to a recording device and a control method thereof.

2. Related Art

JP-A-2018-174519 discloses an image forming device that is an example of a recording device including an image forming unit having a recording head that forms an image by discharging ink onto a recording material, and an image reading unit that reads an image. The image forming unit is an example of a recording unit, the recording material is an example of a medium, the ink is an example of a liquid, and the image reading unit is an example of a reading unit. Furthermore, in the image forming device, it is disclosed that an image on a recording material formed by the image forming unit is read by the image reading unit, and a control unit calculates differences in color and outline from image information of a print job and corrects the image.

In the image forming device disclosed in JP-A-2018-174519, the control unit corrects the image by the image reading unit reading the image on the recording material formed by the image forming unit. However, in the image forming device disclosed in JP-A-2018-174519, when there is an ink discharge failure in the recording head or a difference in an amount of transport of the recording material, there is a possibility that a user will need to confirm the image on the recording material formed by the image forming unit and to perform maintenance for the recording head and correction of the amount of transport.

SUMMARY

A recording device includes a transport unit configured to transport a medium, a recording head configured to record an image by discharging a liquid at a predetermined timing on the medium while moving in a scanning direction intersecting the transport direction, the medium being transported downstream in a transport direction by a predetermined transport amount by the transport unit, a reading unit configured to read the image recorded on the medium by the recording head, and a control unit, wherein the control unit has a function of performing maintenance for a discharge failure of the liquid, a correction of the transport amount, and a correction of the discharge timing of the liquid based on a reading result of the image read by the reading unit.

A method of controlling a recording device is a method of controlling a recording device that records an image by discharging a liquid on a medium, including recording the image on the medium transported by a predetermined transport amount in a transport direction by discharging the liquid at a predetermined timing while moving in a scanning direction intersecting the transport direction, and performing any one of maintenance for a discharge failure of the liquid, a correction of the transport amount, and a correction of the discharge timing of the liquid based on a reading result of the image read from the image recorded on the medium.

DESCRIPTION OF EXEMPLARY EMBODIMENTS

Figure 1:
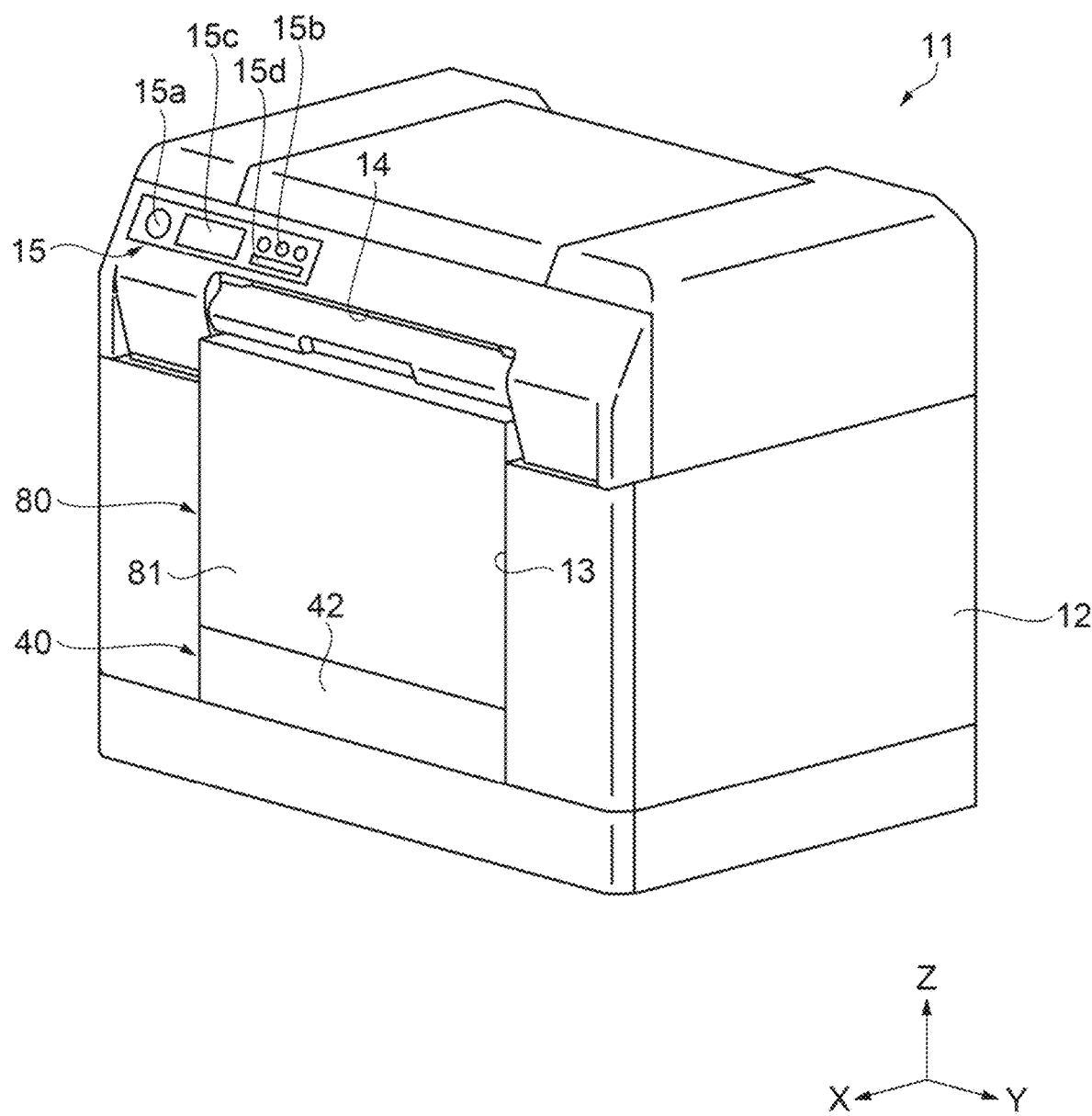
FIG. 1 is a perspective view illustrating an external configuration of a recording device as one embodiment of the present disclosure.

Hereinafter, the present disclosure will be described based on exemplary embodiments. In each of the drawings, the same members are designated by the same reference numerals, and redundant descriptions thereof will be omitted. In this specification, the terms "same" and "identical" not only refer to exactly the same, but also include the case of being the same in consideration of measurement errors, the case of being the same in consideration of manufacturing variations of members, and the case of being the same within a range that does not impair the functions. Thus, for example, "both dimensions are the same" means that a dimensional difference between both of the dimensions is within ±10%, more preferably within ±5 percent, and particularly preferably within ±3 percent of one dimension in consideration of measurement errors and manufacturing variations of members.

In addition, in each of the drawings, X, Y, and Z represent three spatial axes orthogonal to each other In this specification, directions along these axes are referred to as an X-axis direction, a Y-axis direction, and a Z-axis direction. When the directions are specified, a positive direction is indicated as "+" and a negative direction is indicated as "−", both positive and negative signs are used for direction notation, and a direction in which an arrow points in each of the drawings is referred to as a + direction, and a direction opposite to the arrow is referred to as a − direction.

Additionally, the Z-axis direction indicates a direction of gravity, the +Z direction indicates a vertical upward direction, and the −Z direction indicates a vertical downward direction. Further, a plane including the X and Y axes is referred to as an X-Y plane, a plane including the X and Z axes is referred to as an X-Z plane, and a plane including the Y and Z axes is referred to as a Y-Z plane. Also, the X-Y plane is a horizontal plane. Furthermore, the three spatial axes X, Y, and Z, which are not limited to positive and negative directions are described as an X axis, a Y axis, and a Z axis.

1. Embodiment 1

The recording device 11 according to the embodiment is an inkjet type recording device that prints by discharging ink onto medium M, M1. The medium M is, for example, a roll of paper R, and is a long medium wound in a roll shape. The medium M1 is, for example, a cut sheet-like printing paper. The ink is an example of a liquid.

Figure 2:
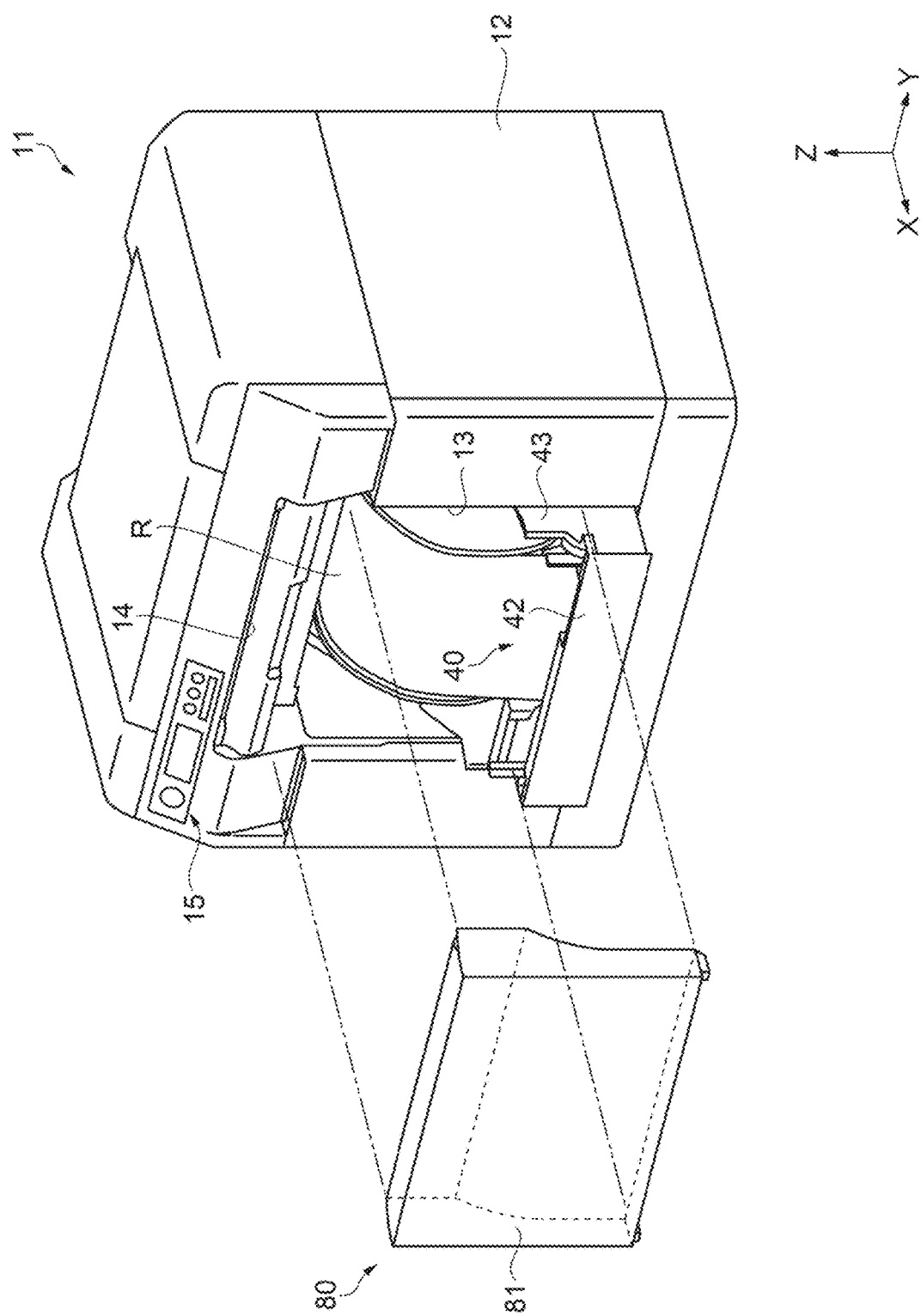
FIG. 2 is a perspective view illustrating an external configuration of the recording device with the accommodation unit exposed.
Figure 3:
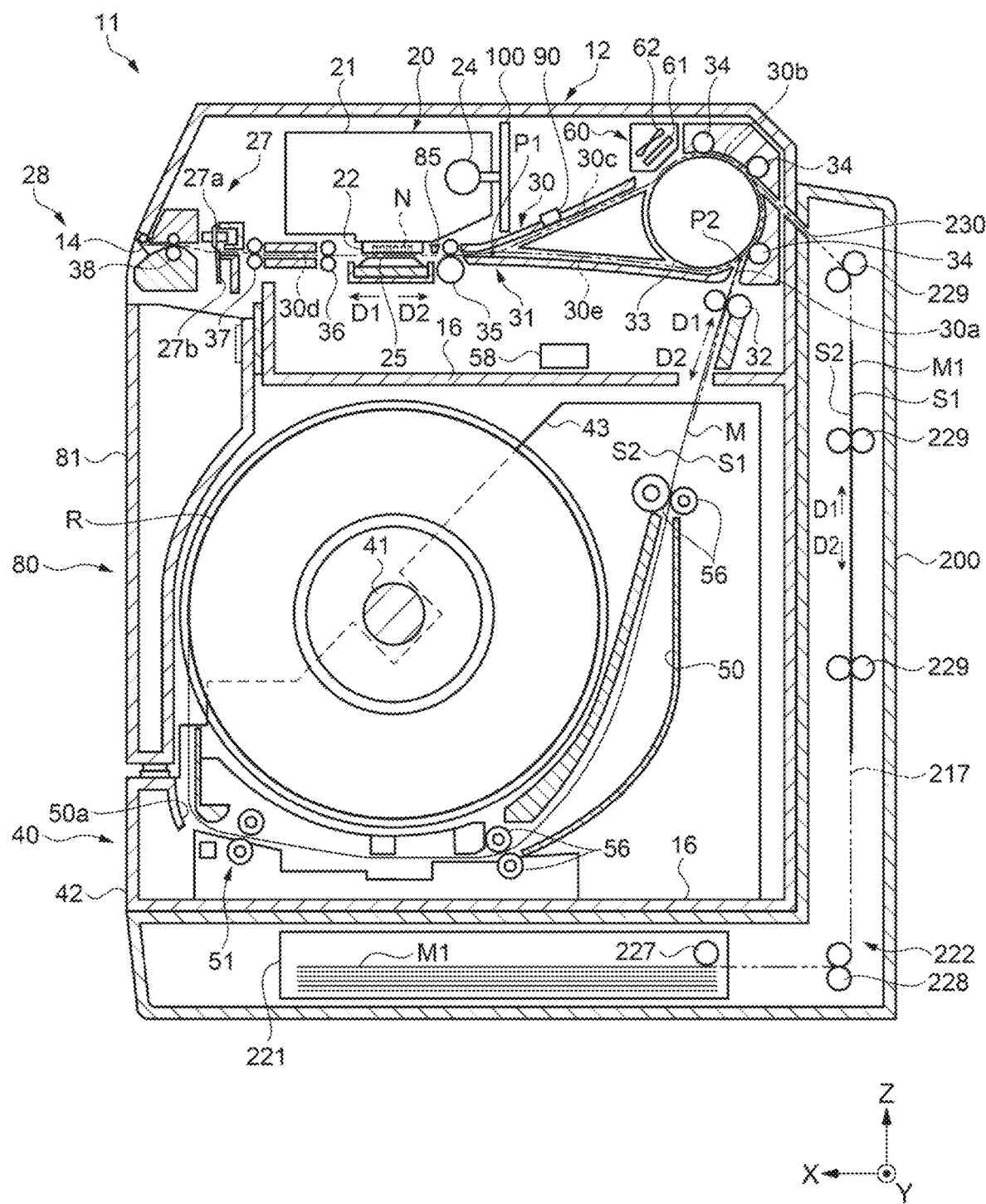
FIG. 3 is a schematic cross-sectional view illustrating an internal configuration of the recording device.

As illustrated in FIGS. 1 to 3, the recording device 11 includes a cuboid housing 12 and a body frame 16 that supports portions of the recording device 11. The housing 12 has an opening portion 13 that opens to a front surface which is a side surface on the +X direction side. In addition, a discharge port 14 that discharges the recorded and cut medium M or the recorded medium M1 is provided in the housing 12. The discharge port 14 constitutes a discharge unit 28.

The recording device 11 includes an accommodation unit 40 and a recording unit 20. The accommodation unit 40 accommodates the roll of paper R and the medium M1. The accommodation unit 40 is installed so as to be capable of being pulled out from the housing 12 through the opening portion 13 in a forward direction that is the +X direction. The accommodation unit 40 includes a front plate portion 42 that, when accommodated in the housing 12, constitutes part of the outer packaging of the recording device 11, and a pair of support walls 43 that rotatably supports the roll of paper R. Further, the accommodation unit 40 accommodates a cassette 221 that accommodates the medium M1 on the −Z direction side of a region in which the roll of paper R is accommodated.

A box-shaped cutting waste accommodation unit 80 that accommodates cutting waste Ma of the medium M produced by cutting performed by a cutting unit 27 is provided below the discharge unit 28. The cutting waste accommodation unit 80 is detachably installed on a front surface of the housing 12 forward of the roll of paper R. The cutting waste accommodation unit 80 closes the opening portion 13 by being attached to the housing 12. The cutting waste accommodation unit 80 includes an outer wall 81 that, when attached to the housing 12, constitutes part of the outer packaging of the recording device 11.

As illustrated in FIG. 2, when the cutting waste accommodation unit 80 is detached from the housing 12, the accommodation unit 40 can be pulled out of the housing 12. In a state in which the accommodation unit 40 is pulled out of the housing 12, the roll of paper R is replaced.

Further, as illustrated in FIG. 1, an operation unit 15 for operating the recording device 11 is provided on the +X direction side of the housing 12. The operation unit 15 is a panel that is horizontally long in the direction along the Y axis and includes a power button 15a operated when the recording device 11 is turned on or off, an input button 15b capable of inputting various types of operation information, and an operation panel 15c having a display of an operation status of the recording device 11 or an operation button for the recording device 11. The operation panel 15c is a touch panel. Additionally, a speaker 15d that emits sound to an exterior is provided.

The recording unit 20 includes a transport path 30 in which the medium M, M1 is transported, as indicated by a two-dot dashed line in FIG. 3. The recording unit 20 includes a transport mechanism 31 that transports the medium M, M1 along the transport path 30, a recording head 22 that performs recording on the medium M, M1, and the cutting unit 27 that cuts the medium M. The recording unit 20 also includes a carriage 21 on which the recording head 22 is mounted, a guide frame 100, a guide shaft 24, and a drive source (not shown). The recording head 22 records an image P on the medium M, M1 transported from the accommodation unit 40. The recording head 22 includes a plurality of nozzles N that discharges ink toward the medium M, M1.

The carriage 21 is supported by the guide frame 100 that extends along the Y axis and the guide shaft 24 that extends along the Y axis and is attached to the guide frame 100. The carriage 21 is movable along the guide shaft 24 with a drive source such as a motor. That is, the carriage 21 is capable of reciprocating in a direction along the Y axis in a state in which the recording head 22 is mounted thereon. A support unit 25 that supports the medium M, M1 is provided at a position opposite to the recording head 22. The direction along the Y axis is an example of a scanning direction.

The recording head 22 records the image P on the medium M, M1 supported by the support unit 25 by discharging ink at a predetermined timing while reciprocating in the Y-axis direction, which is a width direction of the medium M, M1, together with the carriage 21. In the embodiment, although a serial head type in which the recording head 22 reciprocates in the scanning direction is exemplified as the recording head 22, a line head type in which the recording head 22 extends in the Y-axis direction and is fixedly arranged may also be used.

The transport path 30 is a space in which the medium M, M1 is movable, and is configured of a plurality of members. The medium M, M1 is transported in a D1 direction indicated by an arrow and in a D2 direction opposite to the D1 direction in the transport path 30. The D1 direction is an example of the transport direction, an upstream direction in the D1 direction is an upstream direction in the transport direction, and a downstream direction in the D1 direction is a downstream direction in the transport direction. The transport path 30 continues from the accommodation unit 40 located furthest upstream in the D1 direction and feeding the roll of paper R and the medium M1 to the discharge port 14 of the discharge unit 28 located furthest downstream in the D1 direction. The recording head 22, the support unit 25 and the like are disposed on the transport path 30.

The cutting unit 27 is located downstream in the D1 direction from the support unit 25 and upstream in the D1 direction from the discharge port 14. The cutting unit 27 of the embodiment includes a movable blade 27a capable of reciprocating in the Y-axis direction and a fixed blade 27b that does not move. The movable blade 27a is provided on the +Z direction side of the transport path 30, and the fixed blade 27b is provided on the −Z direction side of the transport path 30. The cutting unit 27 cuts the medium M at a cutting position in the width direction. The cutting position is a position of a blade edge of the fixed blade 27b.

The transport path 30 of the embodiment includes, from the upstream of the medium M, M1 in the D1 direction, a first path 30a along which the medium M fed out from the roll of paper R is transported, a cut-sheet transport path 217 along which the medium M1 is transported, a curved path 30b along which the medium M, M1 are bent and transported, a second path 30c along which the medium M, M1 is transported toward the support unit 25 facing the recording head 22, and a third path 30d along which the medium M, M1 is transported from the downstream of the support unit 25 in the D1 direction toward the discharge unit 28.

Furthermore, the transport path 30 includes an inversion path 30e. The inversion path 30e is a passage that connects a branch point P1 branching from the second path 30c with a merge point P2 at which the inversion path 30e merges into the first path 30a. In a transport direction of the medium M, M1 transported via the curved path 30b, the merge point P2 is located upstream in the D1 direction from the branch point P1. That is, the inversion path 30e merges upstream of the curved path 30b. The inversion path 30e is a path for inverting a cut-sheet medium M and the medium M1 and performing recording on both surfaces of the medium M, M1.

The transport mechanism 31 transports the medium M, M1 along the transport path 30 from the accommodation unit 40 to the cutting unit 27 and the discharge unit 28 via the recording head 22. The transport mechanism 31 includes a feed roller pair 32 provided on the first path 30a, an intermediate roller 33 forming the curved path 30b, a plurality of driven rollers 34 disposed along an outer circumferential surface of the intermediate roller 33, and an upstream transport roller pair 35 provided on the second path 30c.

The plurality of driven rollers 34 is provided to be rotatable and is driven to rotate with the medium M, M1 between the driven rollers 34 and the intermediate roller 33. In the embodiment, three driven rollers 34 are provided. Thus, the inverted medium M, M1 can be smoothly transported along the curved path 30b.

The transport mechanism 31 further includes, on the third path 30d, a downstream first transport roller pair 36, a downstream second transport roller pair 37 and a downstream third transport roller pair 38. The downstream second transport roller pair 37 is located upstream in the D1 direction from the cutting unit 27. The downstream third transport roller pair 38 is located downstream in the D1 direction from the cutting unit 27.

In a region of the accommodation unit 40 on the +Z direction side, the roll of paper R is rotatably supported via a support shaft 41 that extends in the Y-axis direction which is the width direction of the housing 12. The support shaft 41 is configured to be capable of being rotational drive in both forward and reverse directions. Thus, the roll of paper R is driven to rotate in both the forward and reverse directions via the support shaft 41. Furthermore, a roll of paper transport path 50 for transporting the medium M fed out from the roll of paper R toward the first path 30a is provided in the accommodation unit 40. The roll of paper transport path 50 is part of the transport path 30.

The roll of paper transport path 50 extends from the +X direction side of the roll of paper R supported via the support shaft 41 toward the −Z direction, then bends in the −X direction, goes around the −Z and −X directions of the roll of paper R and extends in the +Z direction to the first path 30a on the +Z direction side of the roll of paper R.

The roll of paper transport path 50 has a bent portion 50a bending at a substantially right angle at an upstream end portion thereof in the D1 direction, that is, at a position in the +X direction of the roll of paper R that becomes the −Z direction in the roll of paper transport path 50. A decurling mechanism 51 in which decurling that corrects bending tendency of the medium M fed out from the roll of paper R is performed is provided downstream of the bent portion 50a in the D1 direction in the roll of paper transport path 50.

A roll of paper transport roller pair 56 that imparts a transport force to the roll of paper R is installed downstream in the D1 direction from the decurling mechanism 51 with a suitable interval in the roll of paper transport path 50. When the roll of paper transport roller pair 56 drives and rotates, the medium M is fed out from the roll of paper R and is transported to the first path 30a. The roll of paper transport roller pair 56 is part of the transport mechanism 31.

The cassette 221 that accommodates the medium M1 is accommodated in a region of the accommodation unit 40 on the −Z direction side of a region in which the roll of paper R is accommodated. A cut-sheet transporting body 200 capable of transporting the medium M1 is provided on the −X direction side of the accommodation unit 40. The cut-sheet transporting body 200 includes a feeding mechanism 222 that transports the medium M accommodated in the cassette 221 toward the curved path 30b.

The feeding mechanism 222 includes a pickup roller 227 that feeds out the medium M1 located most in the +Z direction among the medium M1 accommodated in the cassette 221 in a stacked state, a separation roller pair 228 that separates the medium M1 fed out by the pickup roller 227 one by one, and a plurality of transport roller pairs 229 that transport the medium M1 along the cut-sheet transport path 217 toward the curved path 30b. The feeding mechanism 222 is part of the transport mechanism 31.

A communication path 230 that communicates with the curved path 30b is provided at a downstream end of the cut-sheet transport path 217 in the D1 direction. The medium M transported from the cassette 221 is transported along the cut-sheet transport path 217 and enters the curved path 30b via the communication path 230. The medium M1 entering the curved path 30b is transported toward the recording head 22 by the transport mechanism 31.

The roll of paper transport roller pair 56 and the feed roller pair 32 transport the medium M by rotating in a state in which the medium M is held therebetween. The separation roller pair 228 and the transport roller pair 229 transport the medium M1 by rotating in the state in which the medium M1 is held therebetween. The intermediate roller 33, the driven roller 34, the upstream transport roller pair 35, the downstream first transport roller pair 36, the downstream second transport roller pair 37, and the downstream third transport roller pair 38 transport the medium M, M1 by rotating in the state in which the medium M, M1 is held therebetween.

When each of the rollers of the transport mechanism 31 is driven to rotate forward, the medium M, M1 is transported from the upstream to the downstream in the D1 direction, and when each of the rollers of the transport mechanism 31 is driven to rotate reversely, the medium M, M1 is transported from the downstream to the upstream in the D1 direction.

The recording device 11 includes a heating unit 60 that heats the transported medium M, M1. The heating unit 60 is provided to face the intermediate roller 33 installed in the curved path 30b and to be adjacent to the downstream of the driven roller 34 located furthest downstream in the D1 direction among the three driven rollers 34. The heating unit 60 is configured to correct the bending tendency of the medium M. The heating unit 60 of the embodiment includes a heater 61 that generates heat and a fan 62 that blows the heat generated by the heater 61 onto the medium M, M1.

A detection unit 85 capable of detecting a leading end portion of the transported medium M, M1 is provided upstream of the recording head 22 in the D1 direction. In the embodiment, the detection unit 85 is disposed between the recording head 22 and the upstream transport roller pair 35 on the transport path 30. The detection unit 85 is, for example, an optical sensor, and has a light emitting unit capable of emitting light and a light receiving unit capable of receiving light. The light emitting unit emits light in the −Z direction of the optical sensor, and the light receiving unit receives reflected light reflected by the medium M, M1. The light emitting unit is configured of a light emitting diode (LED), a laser light emitting element, or the like. In addition, the light receiving unit is configured of a phototransistor, a photo IC, or the like. The light receiving unit acquires a received amount of received light as a voltage value. Additionally, a threshold value for determining whether or not the medium M, M1 is present is provided in the amount of received light, and whether or not the medium M, M1 is present is determined based on the threshold value. Thus, it is possible to detect the leading end portion of the medium M, M1.

Further, the recording device 11 includes an image capturing unit 90. The image capturing unit 90 can capture an image of the medium M, M1 on which the image P is recorded and can read the image P therefrom. The image capturing unit 90 is an example of a reading unit. The recording device 11 of the embodiment is a multi-function printer, a so-called complex machine, which includes the image capturing unit 90 as a scanner capable of reading the image P recorded on the medium M, M1. The recording device 11 may be, for example, a flat-bed type complex machine in which the image capturing unit 90 is disposed in a scanner housing separately provided on the +Z direction side of the housing 12. In this case, the recording device 11 has the image capturing unit 90 outside the recording unit 20.

The recording device 11 of the embodiment includes the image capturing unit 90 on the transport path 30 from the accommodation unit 40 to the discharge unit 28 via the recording unit 20. In the embodiment, the image capturing unit 90 is disposed between the curved path 30b and the recording head 22 in the transport path 30. In other words, the image capturing unit 90 is provided upstream of the recording head 22 in the D1 direction. Additionally, the image capturing unit 90 is disposed between the upstream transport roller pair 35 located upstream in the D1 direction of the recording head 22 and the curved path 30b. Further, in more detail, the image capturing unit 90 is disposed in the second path 30c.

Here, the second path 30c is inclined in the −Z direction from an end portion of the curved path 30b on the +Z direction side toward an end surface of the recording head 22 on the −Z direction side in which ink is discharged from the nozzles N. Additionally, at least part of the image capturing unit 90 is disposed between the end portion of the curved path 30b on the +Z direction side and the end surface of the recording head 22 on the −Z direction side in the Z-axis direction. Thus, a dimension of the recording device 11 in a height direction which is the Z-axis direction can be curbed.

The image capturing unit 90 is, for example, a contact optical sensor (CIS). The image capturing unit 90 is a line-type sensor, and includes a photo sensor (not illustrated), a light source unit, a lens, and the like. The image capturing unit 90 can capture an image of the medium M, M1 in a width direction of the medium M, M1 which is the Y-axis direction. In addition, since the image capturing unit 90 is disposed at a position away from the discharge unit 28, the influence of disturbance light is small, and an image capturing function can be ensured.

The recording device 11, for example, can acquire image data of the image P by reading the image P recorded on the medium M by the recording unit 20, and can newly record the image P on the medium M1 based on the acquired image data of the image P. Further, in the recording device 11 of the embodiment, for example, the image data of the image P and the image data of the image P acquired by reading the image P recorded on the medium M1 are compared, so that any one of maintenance for ink discharge failure in the recording head 22, correction of a transport amount FA, and correction of a discharge timing of the ink in the recording head 22 is performed. The image data of the image P acquired by reading the image P recorded on the medium M1 is an example of a reading result.

Figure 4:
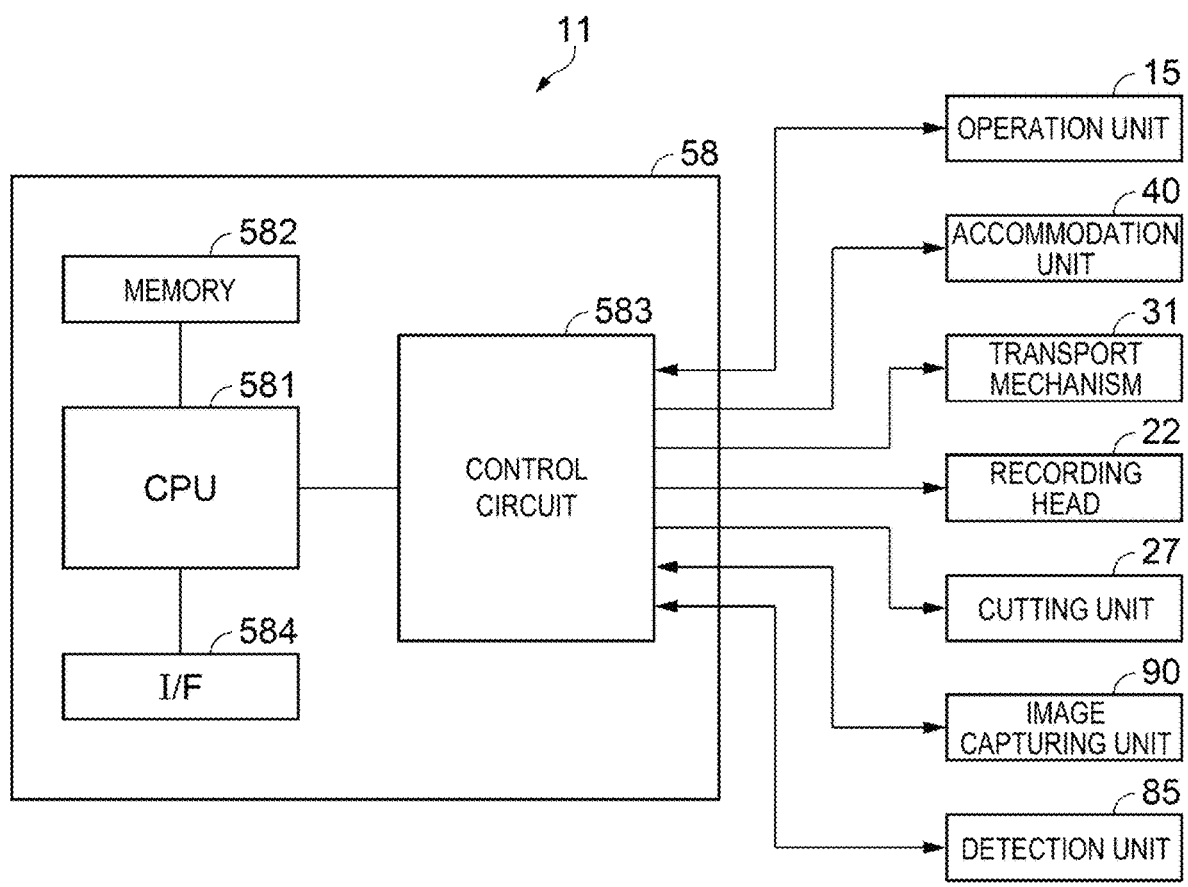
FIG. 4 is a block diagram illustrating a configuration of a control unit of the recording device.

As illustrated in FIG. 4, the recording device 11 includes a control unit 58 that controls various operations performed by the recording device 11. The control unit 58 includes a CPU 581, a memory 582, a control circuit 583 and an interface (I/F) 584. The CPU 581 is an arithmetic processing device. The memory 582 is a storage device ensuring a region for storing programs of the CPU 581, a working region and the like and includes a storage element such as a RAM or EEPROM. When recording data and the like are acquired from outside an information processing terminal or the like via the I/F 584, the CPU 581 controls various drive units and the like.

For example, the control unit 58 transports the medium M, M1 in one of the D1 and D2 direction by controlling any one of the roll of paper transport roller pair 56, the feed roller pair 32, the pickup roller 227, the separation roller pair 228, the transport roller pair 229, the intermediate roller 33, the driven roller 34, the upstream transport roller pair 35, the downstream first transport roller pair 36, the downstream second transport roller pair 37, and the downstream third transport roller pair 38.

For example, when the image P is recorded on the medium M1, the control unit 58 controls the upstream transport roller pair 35 to transport the medium M1 in the D1 direction by the transport amount FA, and controls the recording head 22, while the carriage 21 reciprocates in the Y-axis direction by controlling the drive source that moves the carriage 21, to discharge ink toward the medium M1 supported by the support unit 25 at a predetermined timing. Then, the control unit 58 records the image P on the medium M1 by repeating the transport of the medium M1 by the transport amount FA by the upstream transport roller pair 35 and stopping of the transport, and discharging of the ink by the recording head 22 while reciprocating in the Y-axis direction. The upstream transport roller pair 35 is an example of the transport unit.

When the image P is recorded on the medium M, M1, the upstream transport roller pair 35 transports the medium M, M1 toward the support unit 25 facing the recording head 22. Therefore, a configuration having a high transport accuracy is employed in the upstream transport roller pair 35 compared to another roller pair constituting the transport mechanism 31. For example, a so-called non-slip roller such as a metal roller in which a portion of a peripheral surface is made to be a rough surface, a metal roller in which metal grains are provided on a peripheral surface, and the like is employed for a driving roller constituting the upstream transport roller pair 35.

In addition, for example, the control unit 58 controls the image capturing unit 90 to read the image P recorded on the medium M1, and performs any one of maintenance for ink discharge failure in the recording head 22, the correction of the transport amount FA, and the correction of the ink discharge timing in the recording head 22 based on the image data of the image P read by the image capturing unit 90. In this case, the image P may be a photographic image, a letter, a printing file of a table, or the like, but a confirmation pattern CP as illustrated in FIG. 18 may be used.

Figure 18:
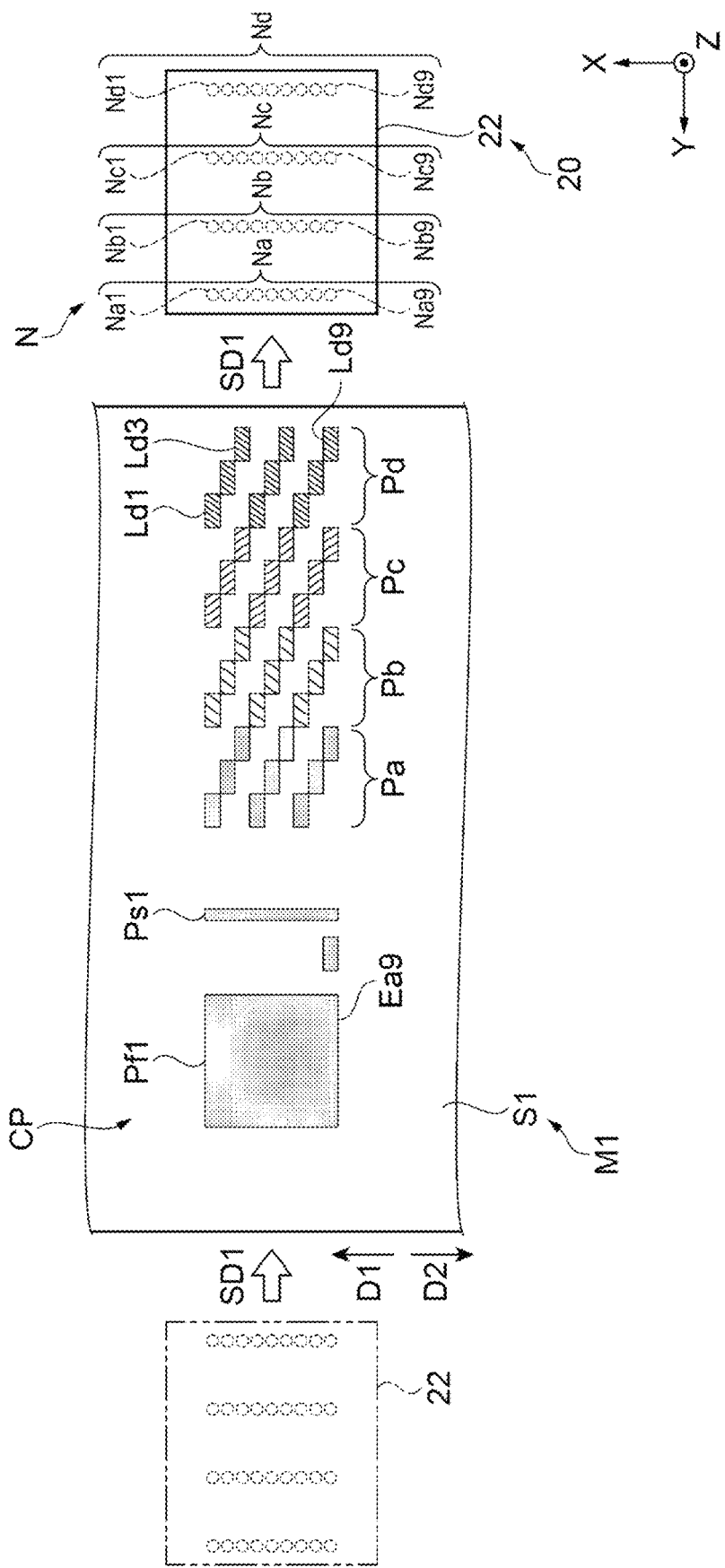
FIG. 18 is a schematic view illustrating a confirmation pattern.

For example, as illustrated in FIG. 18, the plurality of nozzles N of the recording head 22 form four nozzle rows Na, Nb, Nc, and Nd extending in the X-axis direction. The plurality of nozzles N forming each of the nozzle rows Na, Nb, Nc, and Nd discharge the same color ink. The inks to be discharged are, for example, black, cyan, magenta, and yellow inks of a total of four colors, and the respective inks are discharged from the nozzle row Na, the nozzle row Nb, the nozzle row Nc, and the nozzle row Nd.

The nozzle row Na is formed by nine nozzles Na1, Na2, Na3, Na4, Nay, Na6, Na1, Na8, and Na9 arranged from the +X direction side. The nozzle row Nb is formed by nine nozzles Nb1, Nb2, Nb3, Nb4, Nb5, Nb6, Nb7, Nb8, and Nb9 arranged from the +X direction side. The nozzle row Nc is formed by nine nozzles Nc1, Nc2, Nc3, Nc4, Nc5, Nc6, Nc7, Nc8, and Nc9 arranged from the +X direction side. The nozzle row Nd is formed by nine nozzles Nd1, Nd2, Nd3, Nd4, Nd5, Nd6, Nd7, Nd8, and Nd9 arranged from the +X direction side.

Patterns Pa, Pb, Pc, and Pd for confirming a discharge state of the ink from the nozzles N in the recording head 22 are thirty-six linear patterns La1 to Lag, Lb1 to Lb9, Lc1 to Lc9, and Ld1 to Ld9 that extends in the Y-axis direction and are formed by discharging ink from each of the nozzles N while the recording head 22 moves in an SD1 direction that follows the Y-axis direction. For example, in the pattern Pd recorded on a first surface S1 of the medium M1, the linear pattern Ld1 is located on the most +X direction side and the most +Y direction side, the linear pattern Ld3 is located at the third position from the +X direction side, and the linear pattern Ld9 is located on the most −X direction side and the most −Y direction side.

Figure 19:
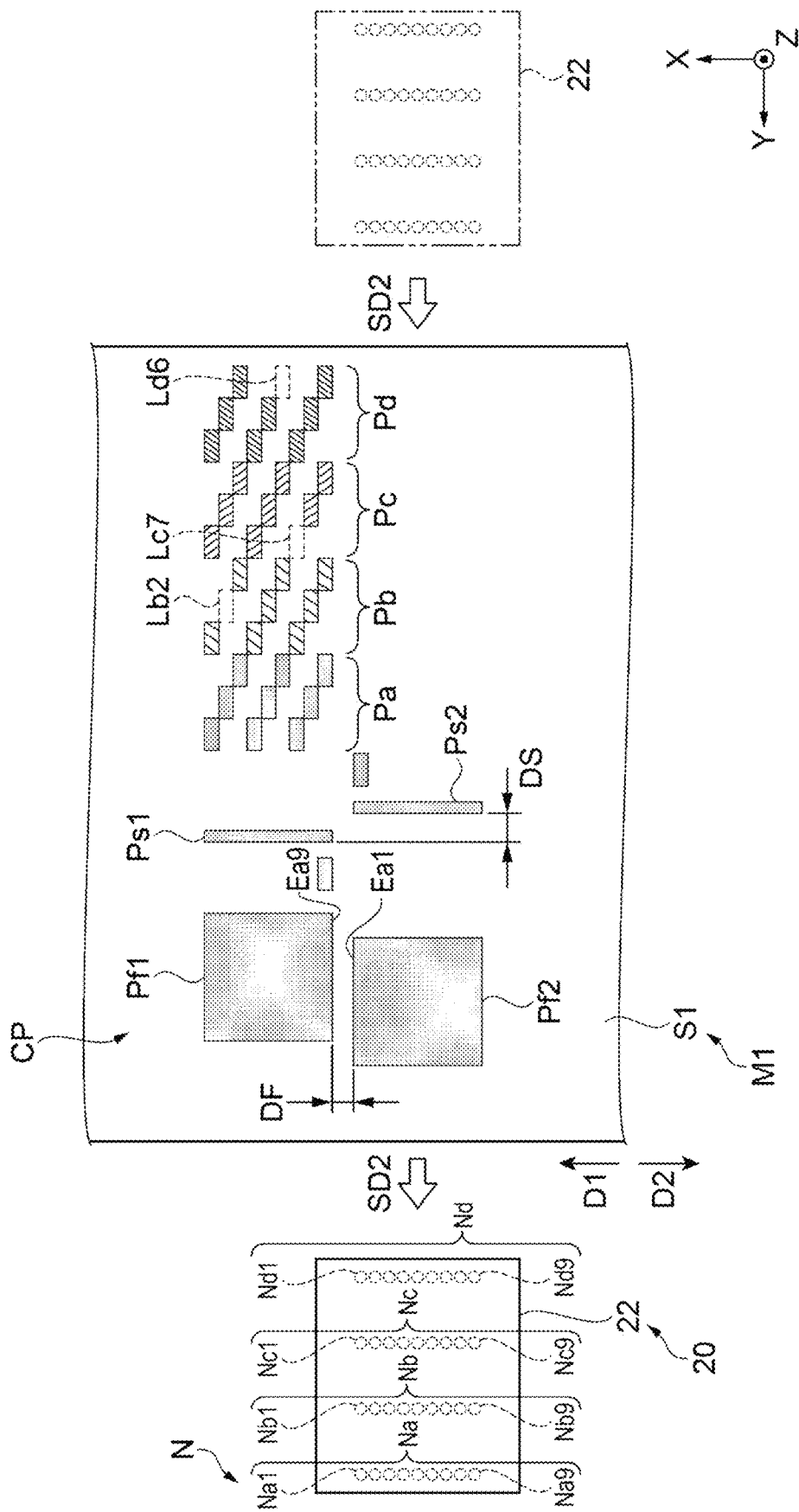
FIG. 19 is a schematic view showing the confirmation pattern.
Figure 20:
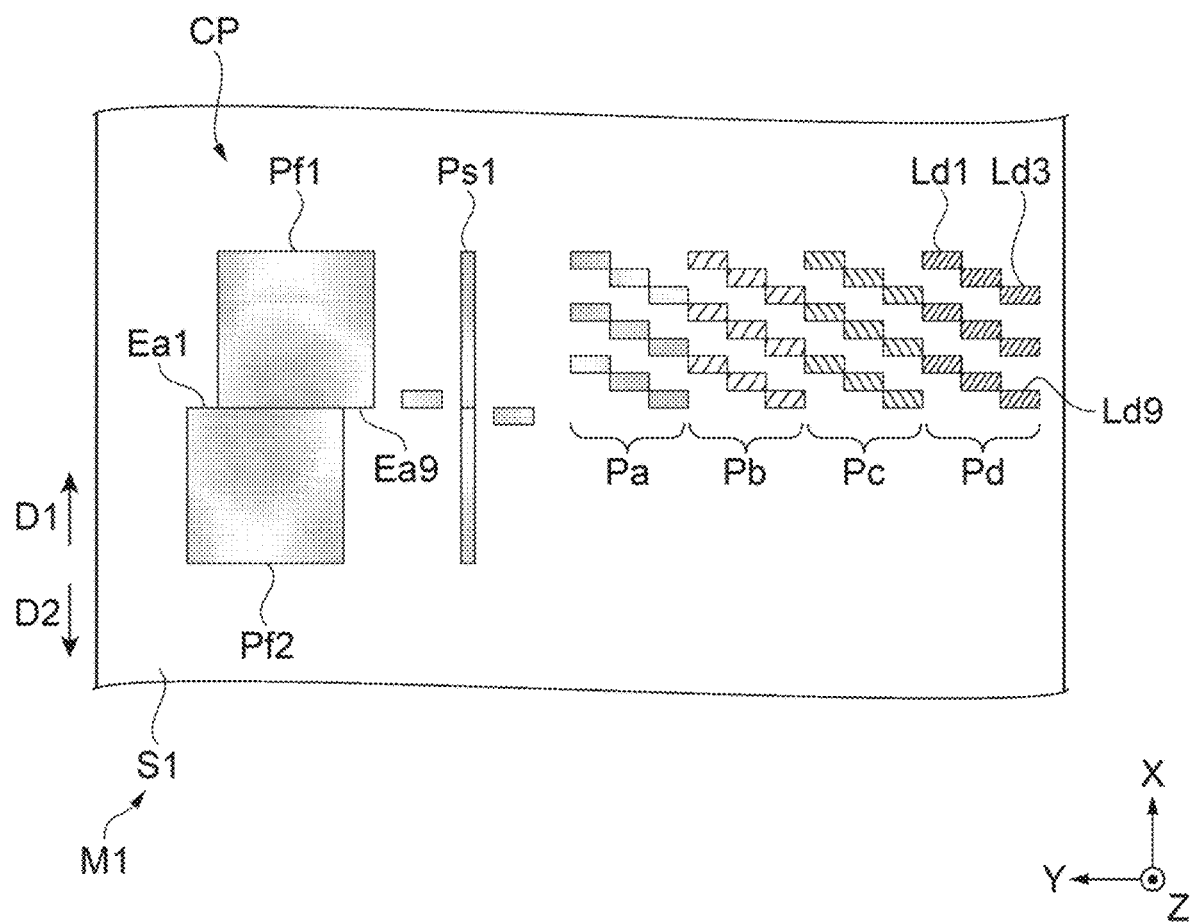
FIG. 20 is a schematic view showing the confirmation pattern.

FIG. 20 shows a confirmation pattern CP when there is no need for the maintenance for the ink discharge failure in the recording head 22, the correction of the transport amount FA, and the correction of the ink discharge timing in the recording head 22. For example, the patterns Pa, Pb, Pc, and Pd recorded on the medium M1 to confirm the discharge state of the ink from the nozzles N in the recording head 22 are illustrated in FIG. 19. In FIG. 19, the linear patterns Lb2, Lc7, and Ld6 are not recorded when compared to the confirmation pattern CP of FIG. 20. In such a case, the control unit 58 determines that the discharge state of the nozzles Nb2, Nc7, and Nd6 is defective, and the maintenance for the ink discharge failure by a maintenance mechanism (not illustrated) is performed.

As illustrated in FIG. 18, a pattern Ps1 for confirming the discharge timing of the ink from the nozzles N in the recording head 22 is, for example, a linear pattern that extends in the X-axis direction and is formed by discharging ink from the nozzles Na1, Na2, Na3, Na4, Na5, Na6, Na1, Na8, and Na9 in the nozzle row Na while the recording head 22 moves in the SD1 direction.

Also, as illustrated in FIG. 19, a pattern Ps2 for confirming the discharge timing of the ink from the nozzles N in the recording head 22 is a linear pattern that extends in the X-axis direction and is formed by discharging the ink at a set predetermined timing from the nozzles Na1, Na2, Na3, Na4, Na5, Na6, Na1, Na8, and Na9, while the medium M1 is transported in the D1 direction by the transport amount FA by the upstream transport roller pair 35 after the pattern Ps1 is recorded on the first surface S1 of the medium M1 and the recording head 22 moves in a direction SD2 that follows the Y-axis direction.

In comparison to the end of the medium M1 in the Y-axis direction, the center of the medium M1 is far from an outer region of the medium M1 in which a movement direction of the recording head 22 is the SD2 direction from the SD1 direction, or the SD1 direction from the SD2 direction. Thus, in the center of the medium M1, a movement operation along the Y axis of the recording head 22 is stable compared to the end of the medium M1 in the Y-axis direction. Thus, the patterns Ps1 and Ps2 for confirming the discharge timing of the ink from the nozzles N in the recording head 22 are recorded in the center of the medium M1 in the Y-axis direction. Thus, it is possible to improve accuracy of correcting the discharge timing of the ink in the recording head 22 based on the reading results of the patterns Ps1 and Ps2.

For example, the patterns Ps1 and Ps2 recorded on the medium M1 to confirm the discharge timing of the ink from the nozzles N in the recording head 22 are illustrated in FIG. 19. In FIG. 19, compared to the confirmation pattern CP of FIG. 20, the pattern Ps2 is shifted from the pattern Ps1 by a distance DS in the −Y direction. In such a case, the control unit 58 delays the setting of the timing of discharging the ink from the nozzles N of the recording head 22 while moving in the SD2 direction so that a position of the pattern Ps2 moves by the distance DS in the +Y direction.

Further, for example, the patterns Ps1 and Ps2 which are linear patterns along the X axis recorded on the medium M1 may be inclined with respect to the X axis. In such a case, the control unit 58 calculates an inclination of each of the patterns Ps1 and Ps2 as linear patterns recorded on the medium M1 with respect to the X axis from reading results of the patterns Ps1 and Ps2 read by the image capturing unit 90.

Then, the control unit 58 may correct the discharge timing of the ink from the plurality of nozzles N constituting each of the nozzle rows Na, Nb, Nc, and Nd such that the patterns Ps1 and Ps2 recorded on the medium M1 are linear patterns along the X axis based on the calculated results. The inclination of the pattern Ps1 as a linear pattern to be recorded on the medium M1 with respect to the X axis occurs due to an inclination of a posture of the recording head 22, for example.

As illustrated in FIG. 18, a pattern Pf1 for confirming the transport amount FA by the upstream transport roller pair 35 is formed by discharging ink from the nozzles Na1, Na2, Na3, Na4, Na5, Na6, Na7, Na8, and Na9 of the nozzle row Na, for example, while the recording head 22 moves in the SD1 direction. The pattern Pf1 is a rectangular pattern in which an outer edge Ea9 on the −X direction side follows the Y axis direction. In this case, the outer edge Ea9 is formed by discharging ink from the nozzle Na9.

Also, as illustrated in FIG. 19, a pattern Pf2 for confirming the transport amount FA is formed by discharging ink from the nozzles Na1, Na2, Na3, Na4, Na5, Na6, Na7, Na8, and Na9 of the nozzle row Na, while the medium M1 is transported in the D1 direction by the transport amount FA by the upstream transport roller pair 35 after the pattern Pf1 is recorded on the first surface S1 of the medium M1 and the recording head 22 moves in an SD2 direction. The pattern Pf2 is a rectangular pattern in which an outer edge Ea1 on the +X direction side follows the Y axis direction. In this case, the outer edge Ea1 is formed by discharging ink from the nozzles Na1.

For example, the patterns Pf1 and Pf2 recorded on the medium M1 to confirm the transport amount FA by the upstream transport roller pair 35 are illustrated in FIG. 19. In FIG. 19, compared to the confirmation pattern CP of FIG. 20, the outer edge Ea1 of the pattern Pf2 is shifted from the outer edge Ea9 of the pattern Pf1 by a distance DF in the −X direction. In such a case, the control unit 58 corrects a setting value of the transport amount FA by the upstream transport roller pair 35 to be less by the distance DF so that a position of the pattern Pf2 moves in the +X direction by the distance DF.

The confirmation pattern CP may not include three of the patterns Pa, Pb, Pc, and Pd for confirming the discharge state of the ink, the patterns Pf1 and Pf2 for confirming the transport amount FA, and the patterns Ps1 and Ps2 for confirming the discharge timing, and may include at least one of them. In this case, the control unit 58 performs any of the maintenance and the correction corresponding to one pattern constituting the confirmation pattern CP, as necessary, among the maintenance for the ink discharge failure, the correction of the transport amount FA, and the correction of the discharge timing of the ink in the recording head 22 based on the image data of the confirmation pattern CP read by the image capturing unit 90.

Further, for example, the confirmation pattern CP may be constituted of the two including the patterns Pa, Pb, Pc, and Pd for confirming the discharge state of the ink and the patterns Pf1 and Pf2 for confirming the transport amount FA. Alternatively, the confirmation pattern CP may be constituted of the two including the patterns Pa, Pb, Pc, and Pd for confirming the discharge state of the ink and the patterns Ps1 and Ps2 for confirming the discharge timing. Alternatively, the confirmation pattern CP may be constituted of the two including the patterns Pf1 and Pf2 for confirming the transport amount FA and the patterns Ps1 and Ps2 for confirming the discharge timing.

In this case, the control unit 58 performs any two of the maintenance and the correction corresponding to two patterns constituting the confirmation pattern CP, as necessary, among the maintenance for the ink discharge failure, the correction of the transport amount FA, and the correction of the discharge timing of the ink in the recording head 22 based on the image data of the confirmation pattern CP read by the image capturing unit 90.

Figure 21:
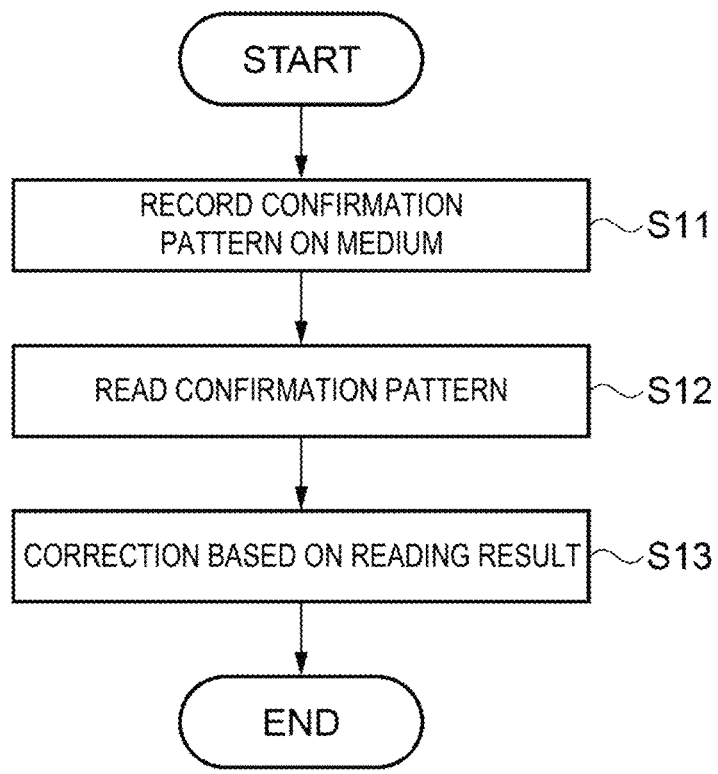
FIG. 21 is a flowchart illustrating a flow of processing of the recording device.

Next, with reference to a flowchart illustrated in FIG. 21, in the embodiment, a processing flow when the recording device 11 performs any one of the maintenance for the ink discharge failure, the correction of the transport amount FA, and the correction of the discharge timing of the ink based on the reading result of the confirmation pattern CP read from the confirmation pattern CP as the image P recorded on the medium M1 will be described.

In the embodiment, the processing flow when the control unit 58 performs any one of the maintenance for the ink discharge failure, the correction of the transport amount FA, and the correction of the discharge timing of the ink based on the reading result of the confirmation pattern CP read from the confirmation pattern CP recorded on the medium M1 corresponds to a control method of the recording device.

Figure 5:
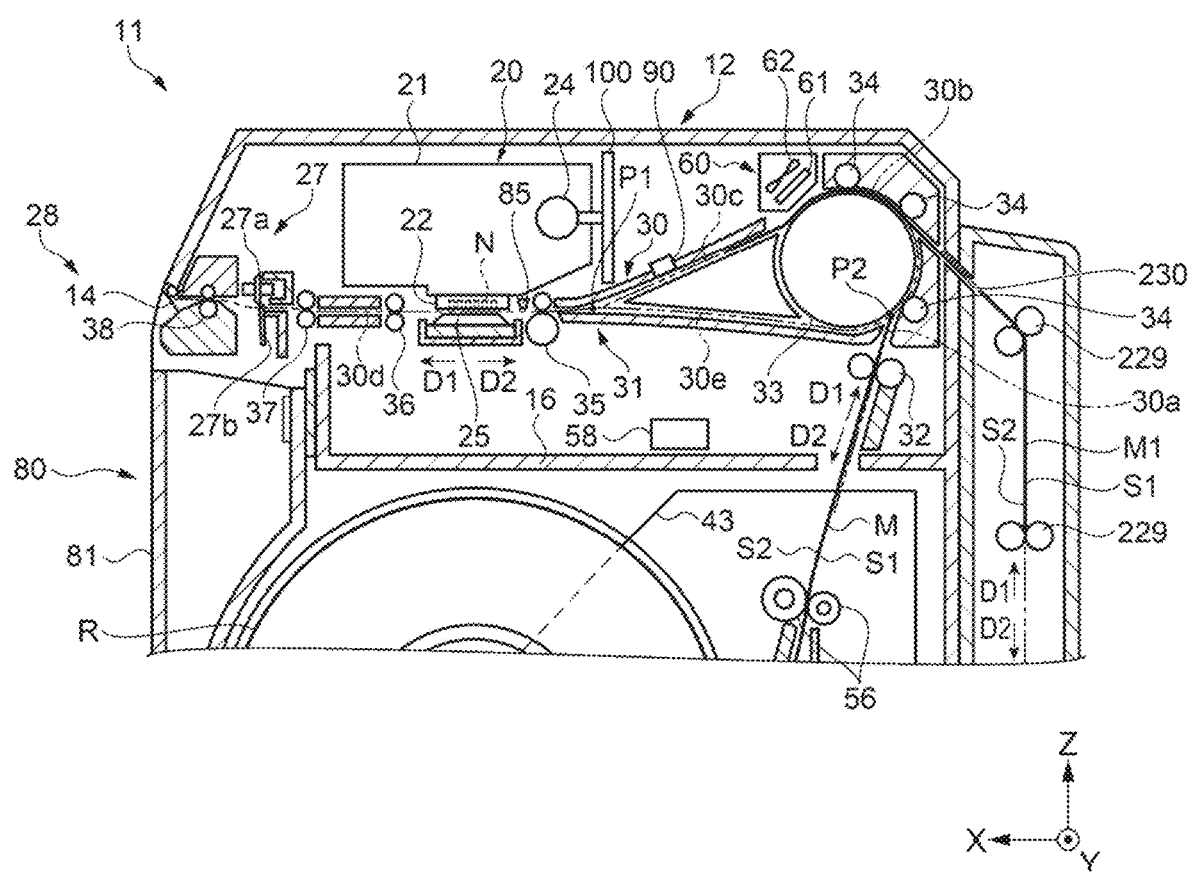
FIG. 5 is a schematic view illustrating a control method of the recording device.

In Step S11, the control unit 58 records the confirmation pattern CP on the medium M1. For example, when the confirmation pattern CP is recorded on the first surface S1 of the medium M1, as illustrated in FIGS. 3 and 5, the control unit 58 controls the pickup roller 227, the separation roller pair 228, and the transport roller pair 229 so that the medium M1 is transported in the D1 direction from the cassette 221 and enters the curved path 30b via the cut-sheet transport path 217 and the communication path 230.

Figure 6:
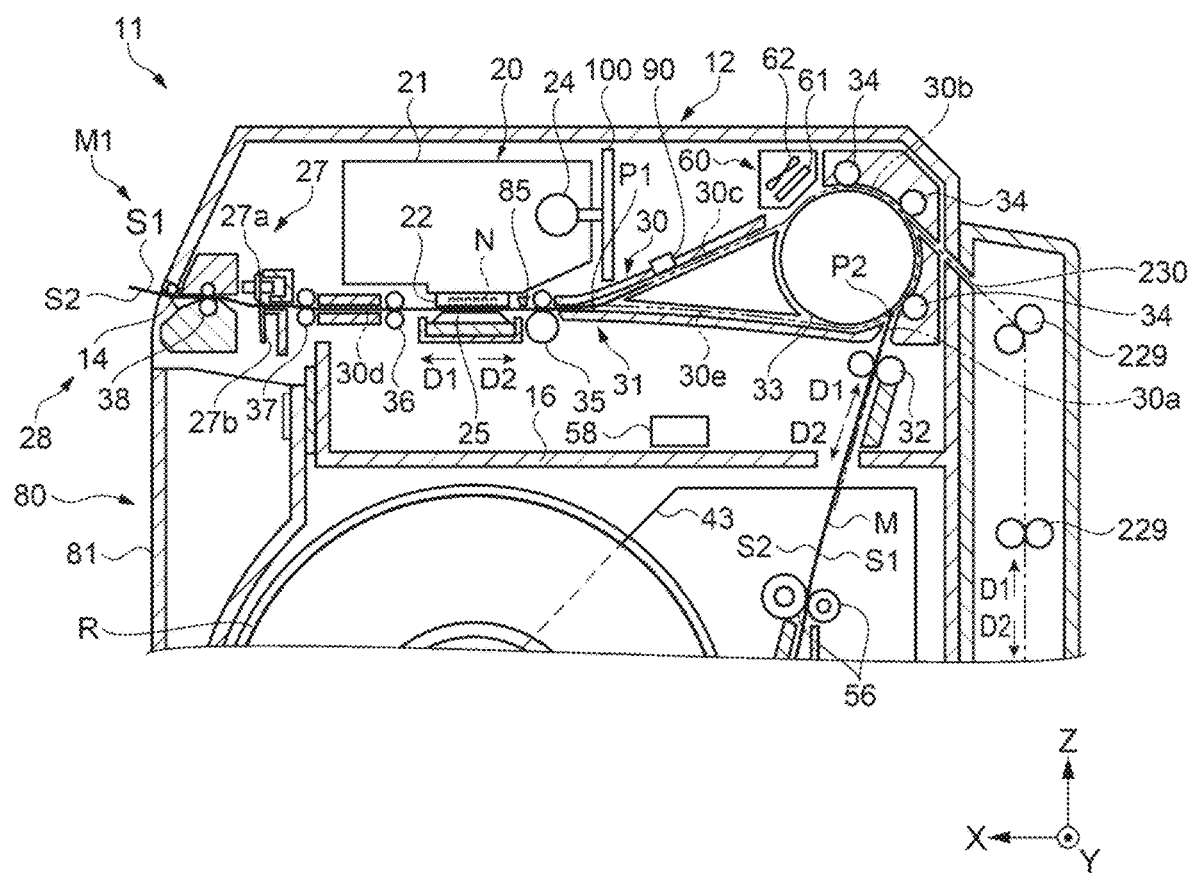
FIG. 6 is a schematic view illustrating the control method of the recording device.

Additionally, as illustrated in FIG. 6, the control unit 58 controls the intermediate roller 33 to transport the medium M1 in the D1 direction toward the upstream transport roller pair 35 via the second path 30c. Then, the control unit 58 controls the upstream transport roller pair 35 to transport the medium M1 in the D1 direction to a position at which a region of the medium M1 on the rear end side that is the end side upstream in the D1 direction from the center is supported by the support unit 25. Then, as illustrated in FIG. 18, the control unit 58 controls the recording head 22 to discharge ink from the nozzles N at a predetermined timing while moving the recording head 22 in the SD1 direction and to record the patterns Pf1, Ps1, Pa, Pb, Pc, and Pd in the confirmation pattern CP on the first surface S1.

Figure 7:
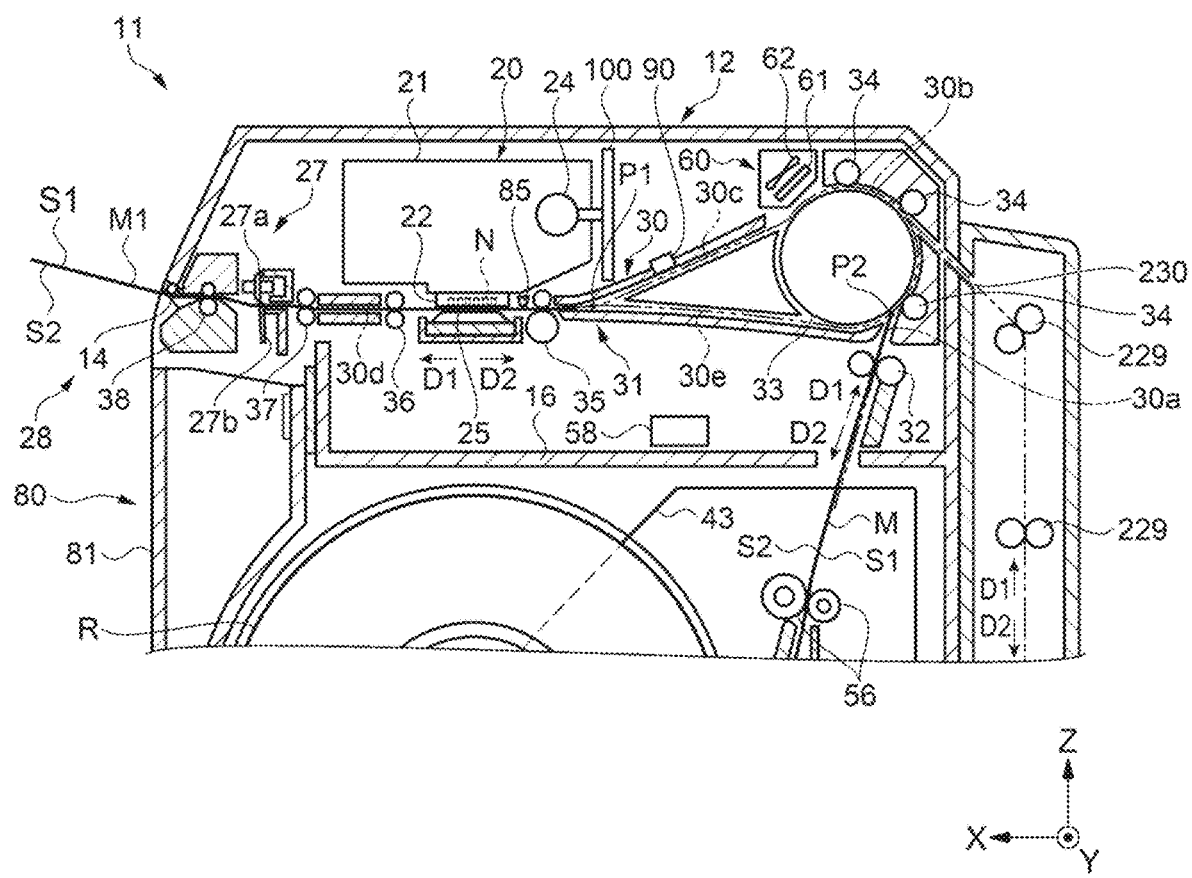
FIG. 7 is a schematic view illustrating the control method of the recording device.

Additionally, as illustrated in FIG. 7, the control unit 58 controls the upstream transport roller pair 35 to transport the medium M1 in the D1 direction by the transport amount FA. Then, as illustrated in FIG. 19, the control unit 58 controls the recording head 22 to discharge ink from the nozzles N at a predetermined timing while moving the recording head 22 in the SD2 direction and to record the patterns Ps2 and Pf2 in the confirmation pattern CP on the first surface S1 of the medium M1.

In this case, the confirmation pattern CP is recorded in a region of the medium M1 on the rear end side that is the end side upstream in the D1 direction from the center of the first surface S1. Further, the confirmation pattern CP is recorded on the first surface S1 of the medium M1 by discharging ink from the nozzles N while the recording head 22 reciprocates once in the SD1 direction and the SD2 direction that are the Y-axis direction.

In Step S11, when recording of the confirmation pattern CP on the medium M1 is performed, the control unit 58 shifts the processing to Step S12.

Figure 8:
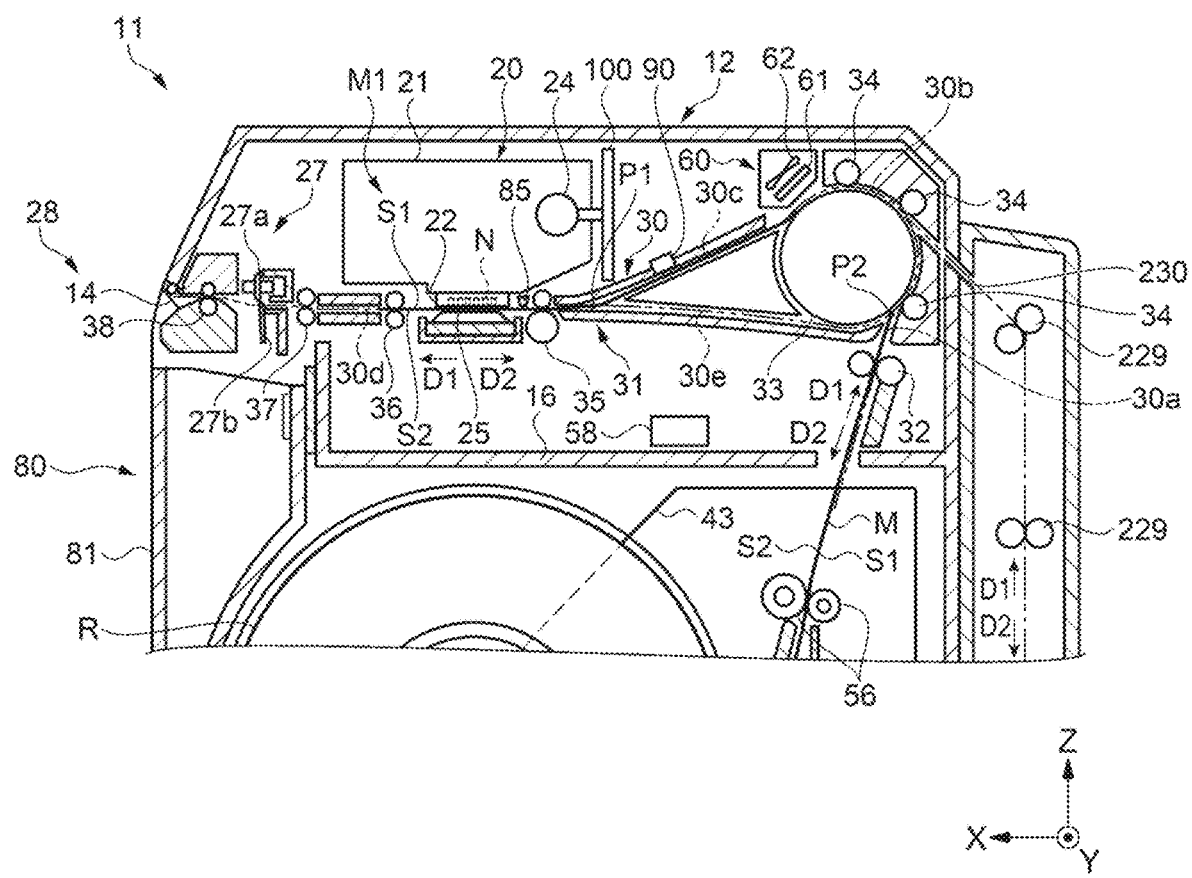
FIG. 8 is a schematic view illustrating the control method of the recording device.

In Step S12, the control unit 58 reads the confirmation pattern CP. Specifically, as illustrated in FIG. 8, the control unit 58 controls the upstream transport roller pair 35 to transport the medium M1 in the D2 direction and to move the medium M1 to a position at which the region of the medium M1 on the rear end side in which the confirmation pattern CP is recorded is located upstream of the image capturing unit 90 in the D1 direction in the second path 30c. Then, the control unit 58 controls the upstream transport roller pair 35 and the image capturing unit 90 to read the confirmation pattern CP recorded on the first surface S1 of the medium M1 with the image capturing unit 90 while the medium M1 is transported in the D1 direction.

When a range in the D1 direction in a readable range of the image capturing unit 90 is wider than a width of the confirmation pattern CP in the D1 direction of the medium M1, the control unit 58 controls the upstream transport roller pair 35 to transport the medium M1 in the D2 direction and to move the medium M1 to a position at which the region of the medium M1 on the rear end side in which the confirmation pattern CP is recorded faces the image capturing unit 90 in the second path 30c In a state in which the medium M1 is stationary, the control unit 58 may control the image capturing unit 90 to read the confirmation pattern CP recorded on the first surface S1 of the medium M1 with the image capturing unit 90.

In Step S12, when reading of the confirmation pattern CP is performed, the control unit 58 shifts the processing to Step S13.

In Step S13, the control unit 58 performs correction based on the reading result. Specifically, the control unit 58 compares the image data of the confirmation pattern CP with the reading result of the confirmation pattern CP read by the image capturing unit 90. When the control unit 58 determines that any one of the maintenance for the ink discharge failure in the recording head 22, the correction of the transport amount FA, and the correction of the discharge timing of the ink in the recording head 22 is necessary, the control unit 58 notifies a user of the determination result and confirms whether or not the performance is possible. Specifically, the determination result may be displayed on the operation panel 15c of the operation unit 15, or the determination result may be notified by sound via the speaker 15d.

Then, when the user allows the performance of the maintenance for the discharge failure, the correction of the transport amount FA, and the correction of the discharge timing based on the reading result, the control unit 58 performs any one of the maintenance for the ink discharge failure, the correction of the transport amount FA, and the correction of the discharge timing of the ink in the recording head 22.

In the embodiment, when determining that the maintenance for the ink discharge failure in the recording head 22 is necessary from the reading result of the confirmation pattern CP read by the image capturing unit 90, the control unit 58 does not perform the correction even when it is determined that any one of the correction of the transport amount FA and the correction of the discharge timing of the ink in the recording head 22 is necessary. Then, the control unit 58 performs the maintenance for the ink discharge failure in the recording head 22 and then again performs the recording of the confirmation pattern CP and the reading of the recorded confirmation pattern CP.

Figure 9:
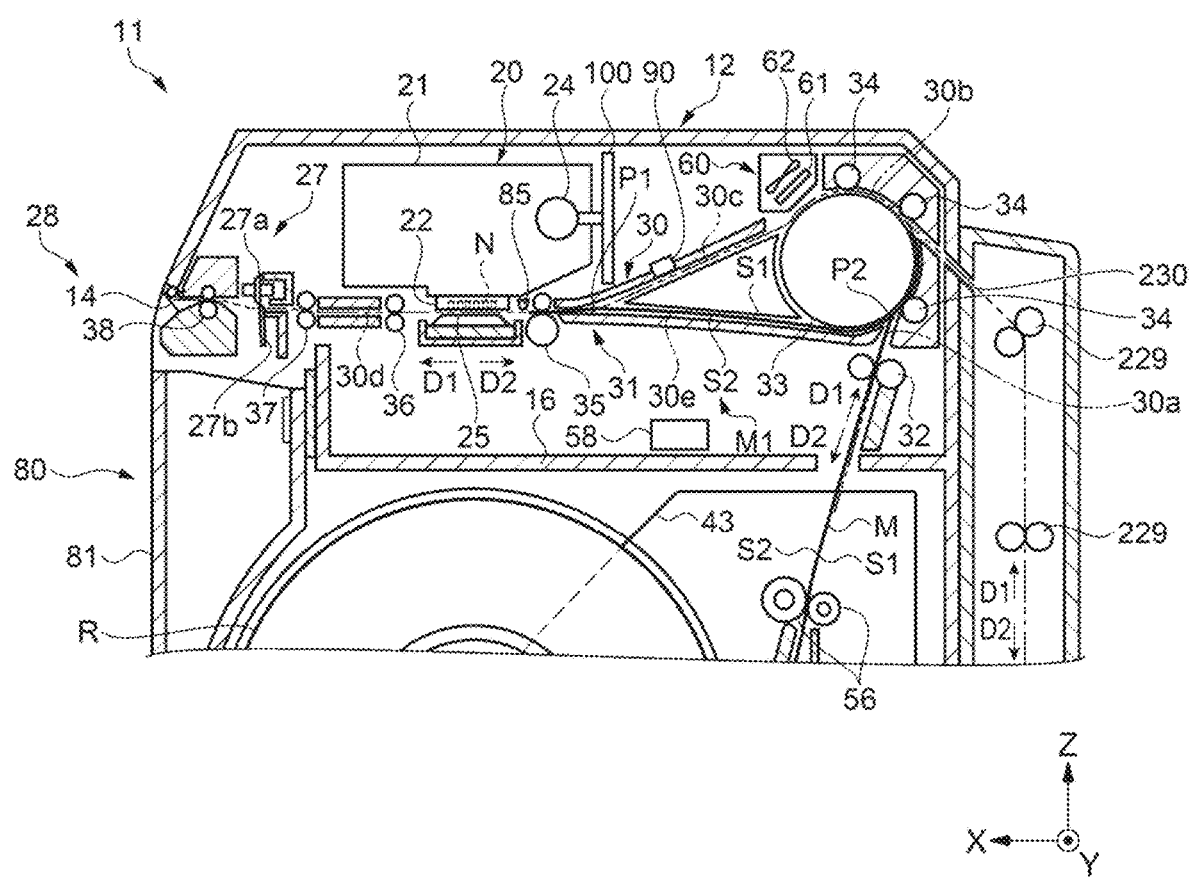
FIG. 9 is a schematic view illustrating the control method of the recording device.

For example, it is assumed that the user determines that the maintenance for the ink discharge failure in the recording head 22 is necessary from the reading result of the confirmation pattern CP and operates the input button 15b to allow the maintenance for the discharge failure. In this case, after the maintenance for the discharge failure is performed, the control unit 58 controls the upstream transport roller pair 35 to transport the medium M1 in the D1 direction to a position at which the rear end of the medium M1 that is an end located upstream in the D1 direction passes through the branch point P1. Then, as illustrated in FIG. 9, the control unit 58 controls the upstream transport roller pair 35 and the intermediate roller 33 to transport the medium M1 in the D2 direction and to cause the medium M1 to enter the curved path 30b via the inversion path 30e.

Then, the control unit 58 records the confirmation pattern CP on a second surface S2 of the medium M1, similarly to the case in which the confirmation pattern CP is recorded on the first surface S1 of the medium M1. Then, the control unit 58 reads the confirmation pattern CP recorded on the second surface S2 of the medium M1, similarly to the case in which the confirmation pattern CP recorded on the first surface S1 of the medium M1 is read. Then, the control unit 58 compares the image data of the confirmation pattern CP with the reading result of the confirmation pattern CP read by the image capturing unit 90. Then, when it is determined that any one of the maintenance for the ink discharge failure in the recording head 22, the correction of the transport amount FA, and the correction of the discharge timing of the ink in the recording head 22 is necessary, the control unit 58 notifies the user of the determination result.

Then, when the user allows the performance of the maintenance for the discharge failure, the correction of the transport amount FA, and the correction of the discharge timing based on the reading result, the control unit 58 performs any one of the maintenance for the ink discharge failure in the recording head 22, the correction of the transport amount FA, and the correction of the discharge timing of the ink in the recording head 22.

In Step S13, in a case in which the correction based on the reading result is performed, the control unit 58 ends the processing when any one of the maintenance for the ink discharge failure, the correction of the transport amount FA, and the correction of the discharge timing of the ink is performed based on the reading result of the confirmation pattern CP read from the confirmation pattern CP recorded on the medium M1.

Then, the control unit 58 controls the upstream transport roller pair 35 and the downstream third transport roller pair 38 to transport the medium M1 in the D1 direction and to discharge the medium M1 from inside the recording unit 20 via the third path 30d and the discharge port 14. The downstream third transport roller pair 38 is an example of a discharge transport unit.

Next, with reference to FIG. 21, in the embodiment, the processing flow when the recording device 11 performs any one of the maintenance for the ink discharge failure, the correction of the transport amount FA, and the correction of the discharge timing of the ink based on the reading result of the confirmation pattern CP read from the confirmation pattern CP as the image P recorded on the medium M will be described.

In the embodiment, the processing flow when the control unit 58 performs any one of the maintenance for the ink discharge failure, the correction of the transport amount FA, and the correction of the discharge timing of the ink based on the reading result of the confirmation pattern CP read from the confirmation pattern CP recorded on the medium M corresponds to the control method of the recording device.

Figure 10:
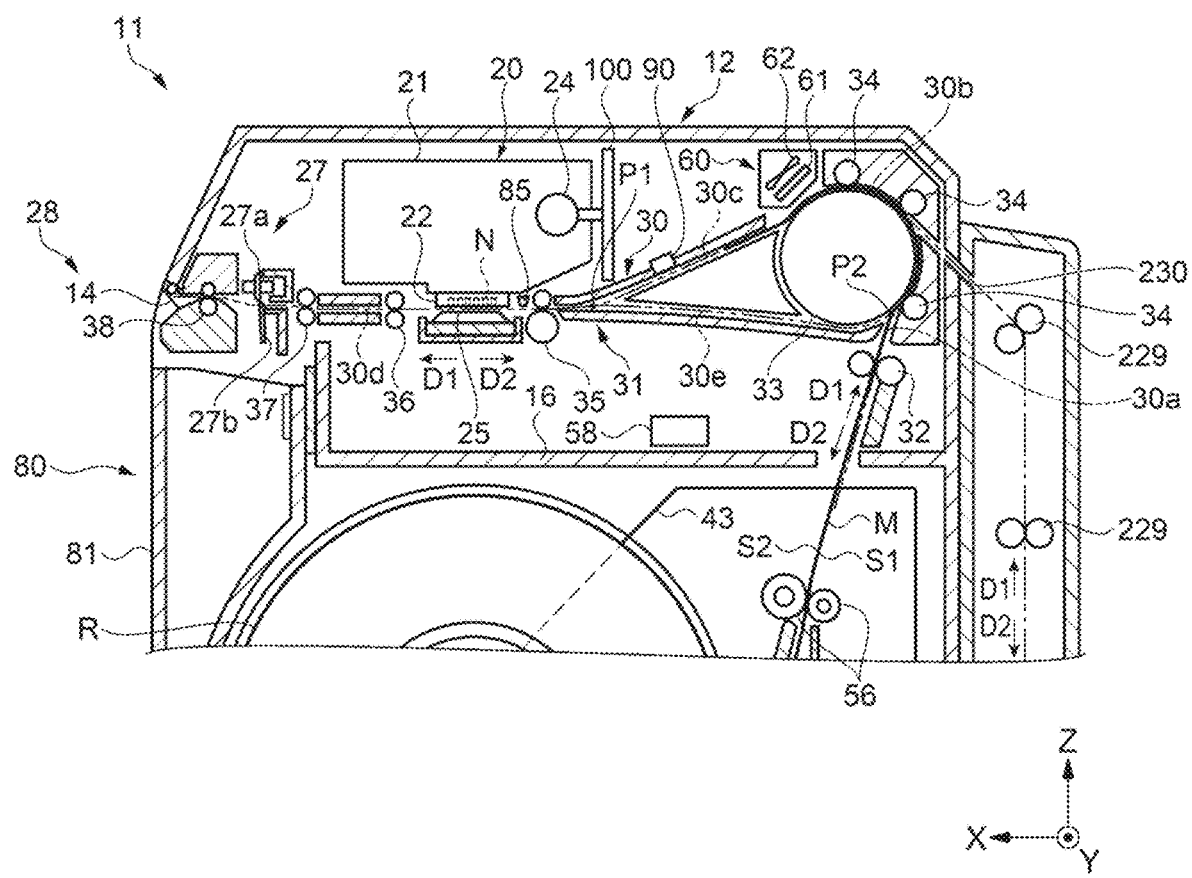
FIG. 10 is a schematic view illustrating the control method of the recording device.

In Step S11, the control unit 58 records the confirmation pattern CP on the medium M. For example, when the confirmation pattern CP is recorded on the first surface S1 of the medium M, as illustrated in FIGS. 3 and 10, the control unit 58 controls the roll of paper transport roller pair 56, the feed roller pair 32, and the intermediate roller 33 to transport the medium M accommodated in the accommodation unit 40 in the D1 direction. The medium M enters the second path 30c via the roll of paper transport path 50, the first path 30a and the curved path 30b and is transported toward the upstream transport roller pair 35.

Figure 11:
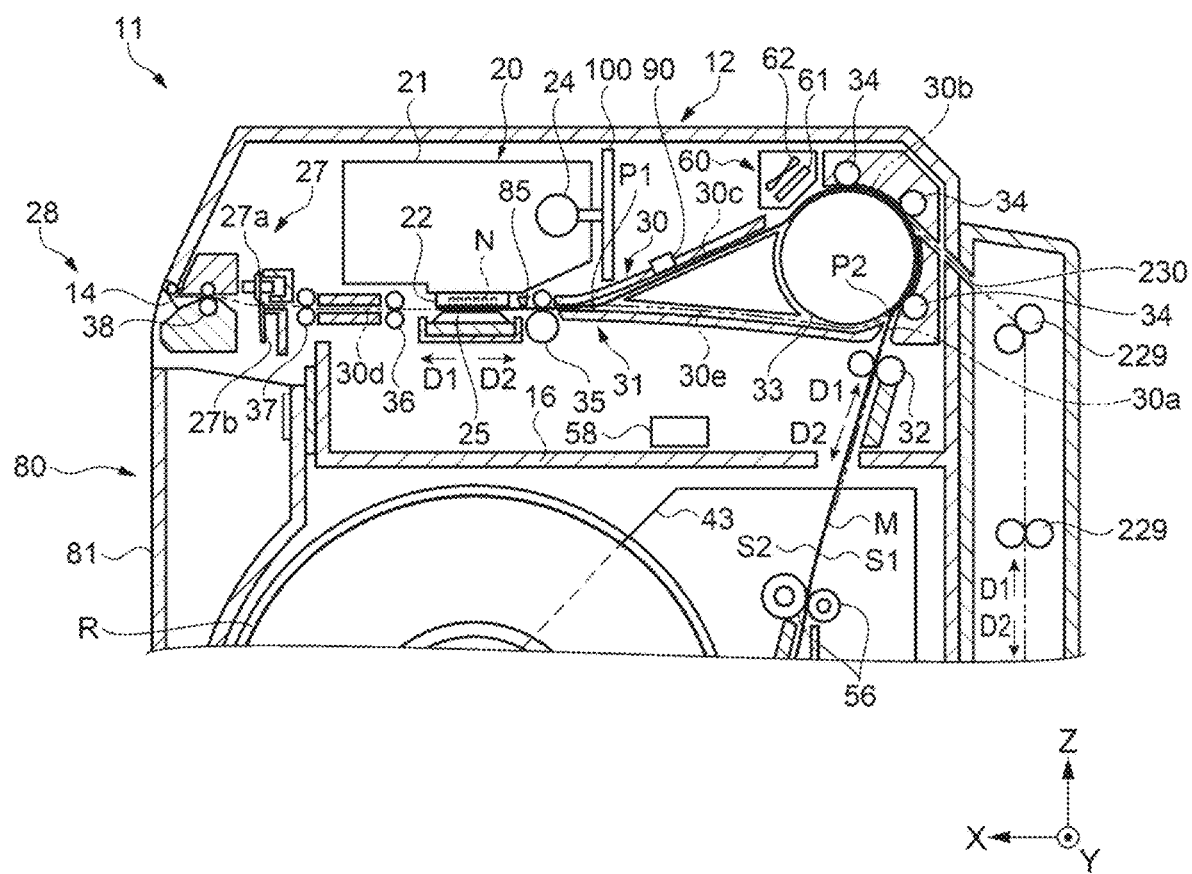
FIG. 11 is a schematic view illustrating the control method of the recording device.

Then, as illustrated in FIG. 11, the control unit 58 controls the upstream transport roller pair 35 to transport the medium M in the D1 direction to a position at which a region of the medium M on the leading end side that is the end side downstream in the D1 direction from the center is supported by the support unit 25. Then, as illustrated in FIG. 18, the control unit 58 controls the recording head 22 to discharge ink from the nozzles N at a predetermined timing while the recording head 22 is moved in the SD1 direction and to record the patterns Pf1, Ps1, Pa, Pb, Pc, and Pd in the confirmation pattern CP on the first surface S1.

Figure 12:
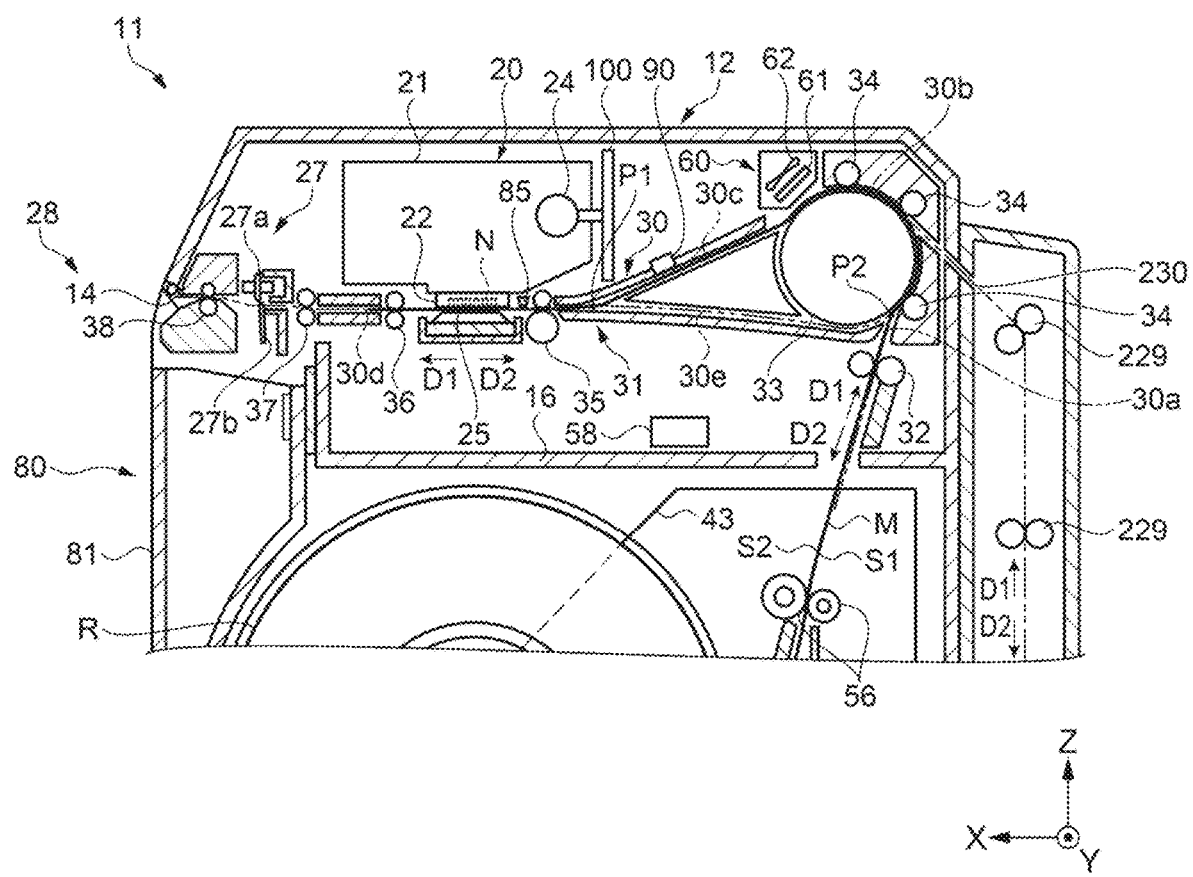
FIG. 12 is a schematic view illustrating the control method of the recording device.

Then, as illustrated in FIG. 12, the control unit 58 controls the upstream transport roller pair 35 to transport the medium M in the D1 direction by the transport amount FA. Then, as illustrated in FIG. 19, the control unit 58 controls the recording head 22 to discharge ink from the nozzles N at a predetermined timing while moving the recording head 22 in the SD2 direction, and to record the patterns Ps2 and Pf2 in the confirmation pattern CP on the first surface S1 of the medium M. In this case, the confirmation pattern CP is recorded in a region on the leading end side of the first surface S1 of the medium M that is the downstream end side in the D1 direction from the center.

Figure 13:
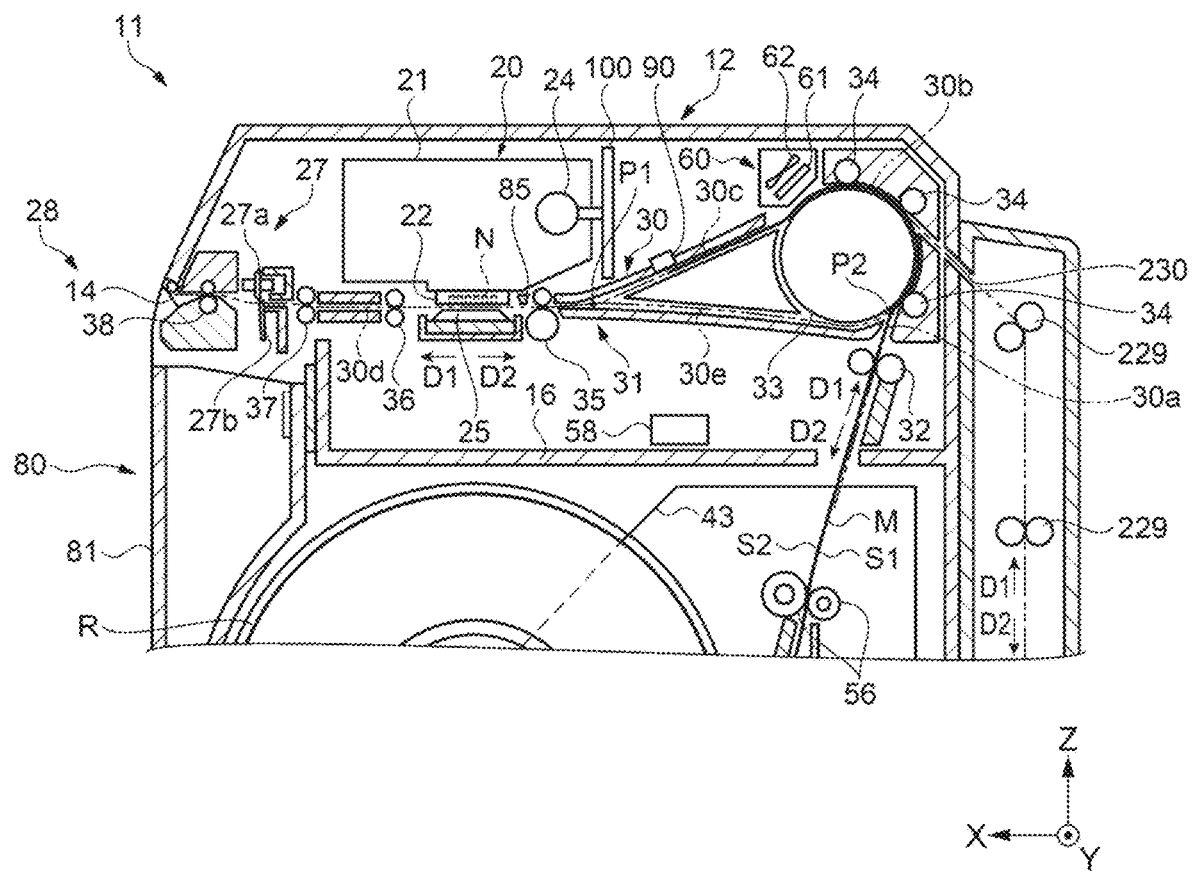
FIG. 13 is a schematic view illustrating the control method of the recording device.

Then, as illustrated in FIG. 13, the control unit 58 controls the upstream transport roller pair 35 to transport the medium M in the D2 direction and to move the medium M to a position at which the region of the medium M on the leading end side in which the confirmation pattern CP is recorded is upstream of the image capturing unit 90 in the D1 direction in the second path 30c. Then, the control unit 58 controls the upstream transport roller pair 35 and the image capturing unit 90 to read the confirmation pattern CP recorded on the first surface S1 of the medium M with the image capturing unit 90 while the medium M is transported in the D1 direction.

In Step S12, when the reading of the confirmation pattern CP is performed, the control unit 58 shifts the processing to Step S13.

In Step S13, the control unit 58 performs the correction based on the reading result. Similar to the operation based on the reading result of the confirmation pattern CP recorded on the medium M1 described above, it is assumed that the control unit 58 determines that any one of the maintenance for the ink discharge failure in the recording head 22, the correction of the transport amount FA, and the correction timing of the discharge timing of the ink in the recording head 22 is necessary based on the reading result of the confirmation pattern CP recorded on the medium M. In this case, the control unit 58 confirms the permission of the user, and performs any one of the maintenance for the ink discharge failure in the recording head 22, the correction of the transport amount FA, and the correction of the discharge timing of the ink in the recording head 22.

In Step S13, when the correction based on the reading result is performed, the control unit 58 ends the processing when any one of the maintenance for the ink discharge failure, the correction of the transport amount FA, and the correction of the discharge timing of the ink is performed based on the reading result of the confirmation pattern CP read from the confirmation pattern CP recorded on the medium M.

Figure 14:
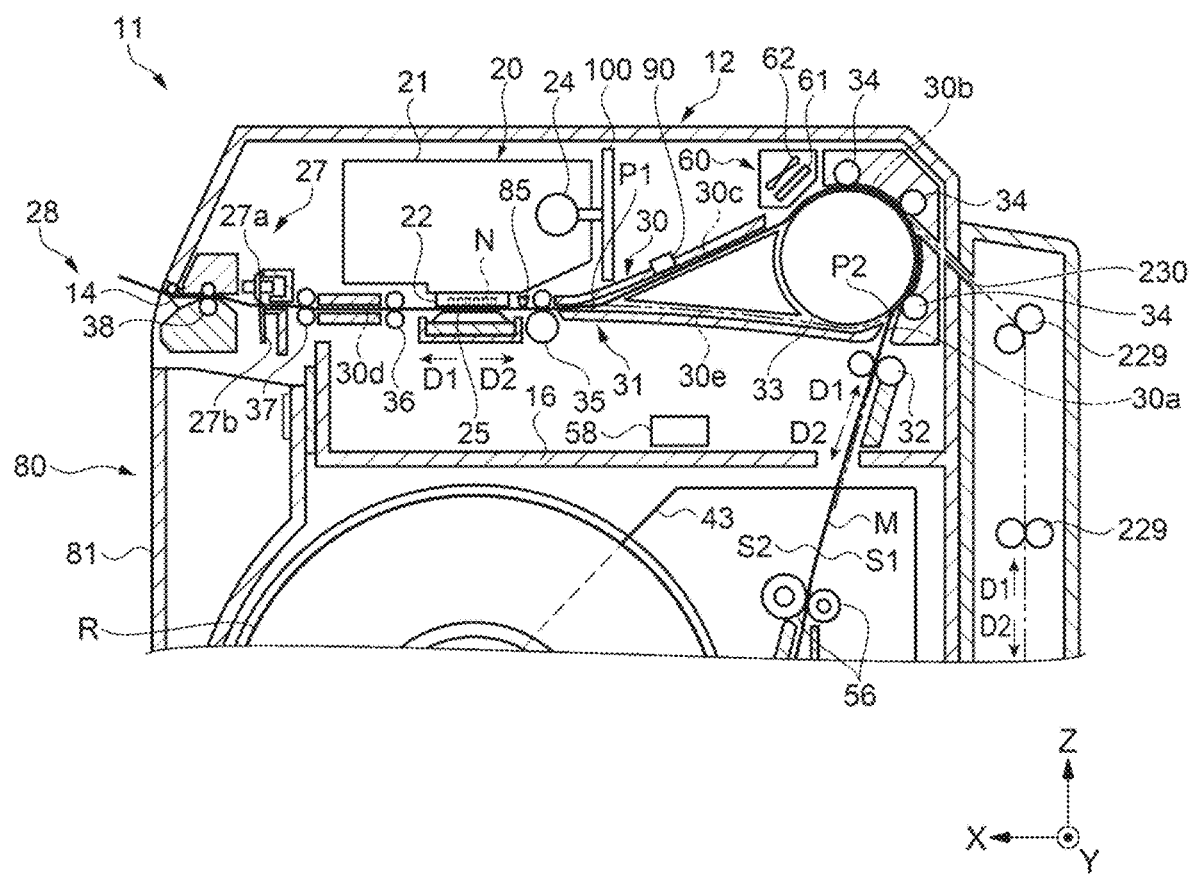
FIG. 14 is a schematic view illustrating the control method of the recording device.

For example, when it is determined that the maintenance for the ink discharge failure in the recording head 22, the correction of the transport amount FA, and the correction of the discharge timing of the ink in the recording head 22 are not necessary, as illustrated in FIG. 14, the control unit 58 controls the upstream transport roller pair 35 and the downstream third transport roller pair 38 to transport the medium M in the D1 direction until the region of the medium M on the leading end side in which the confirmation pattern CP is recorded is located downstream of the cutting unit 27 in the D1 direction.

Figure 15:
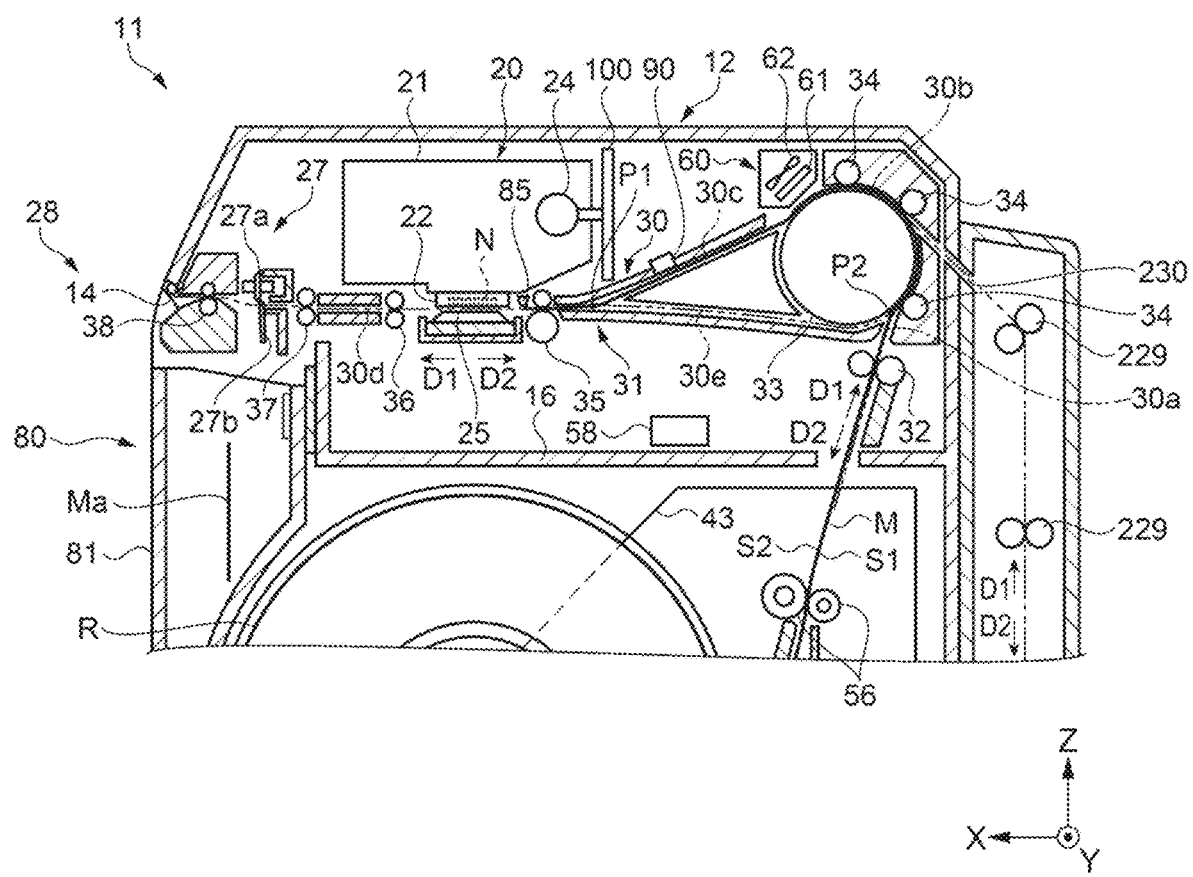
FIG. 15 is a schematic view illustrating the control method of the recording device.

Then, the control unit 58 controls the cutting unit 27 to cut the region of the medium M on the leading end side on which the confirmation pattern CP is recorded. As illustrated in FIG. 15, the region of the cut medium M on the leading end side drops in the −Z direction as the cutting waste Ma, and is accommodated in the cutting waste accommodation unit 80. Then, the control unit 58 controls the upstream transport roller pair 35, the intermediate roller 33, the feed roller pair 32, and the roll of paper transport roller pair 56 to transport the medium M in which the region on the leading end side in which the confirmation pattern CP is recorded is cut in the D2 direction.

Then, the control unit 58 drives the detection unit 85, and stops driving of the upstream transport roller pair 35, the intermediate roller 33, the feed roller pair 32, and the roll of paper transport roller pair 56 at a position at which the leading end of the medium M is detected by the detection unit 85. Thus, as illustrated in FIG. 15, the leading end portion of the medium M is located upstream of the recording head 22 in the D1 direction.

Figure 16:
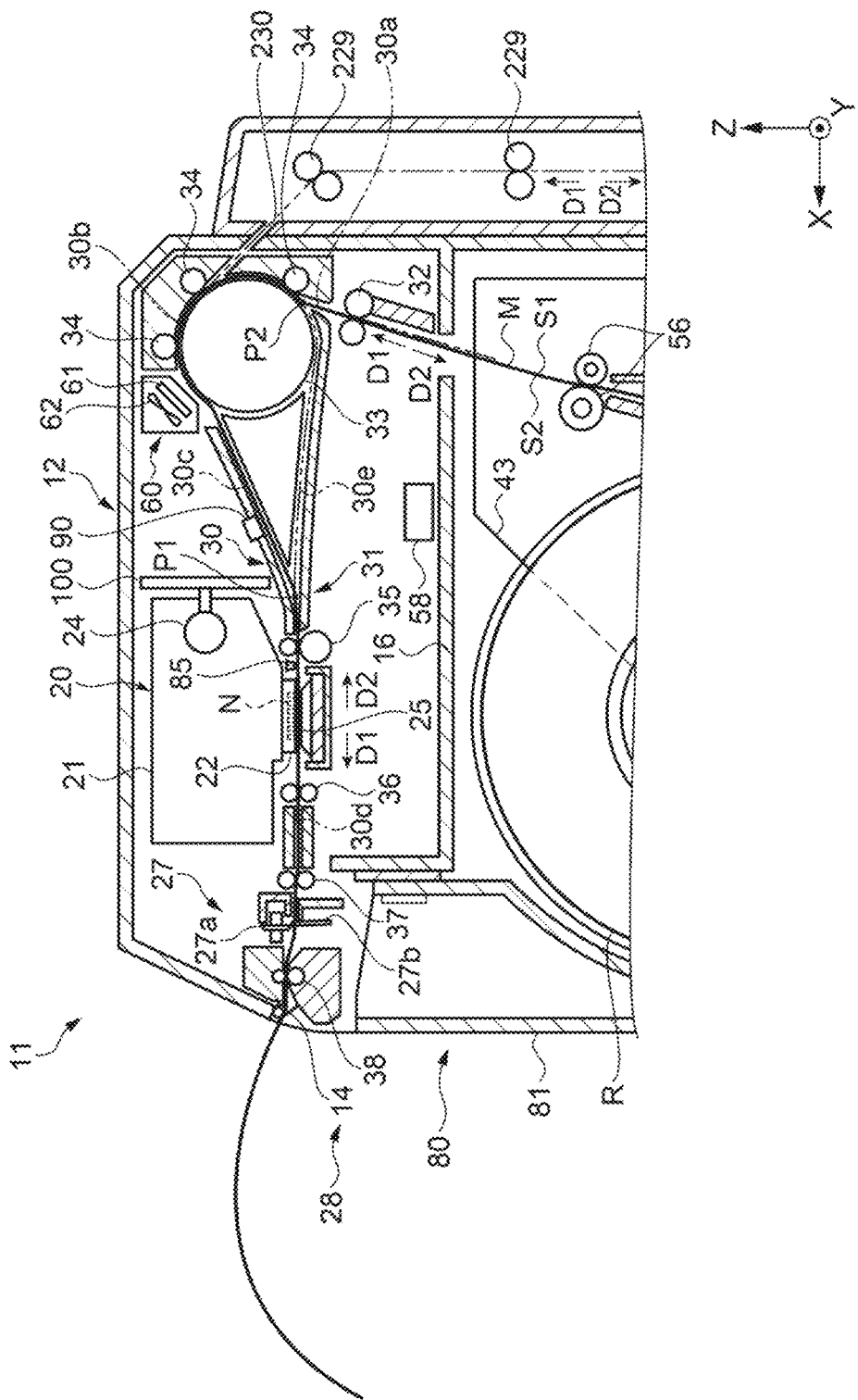
FIG. 16 is a schematic view illustrating the control method of the recording device.

Then, as illustrated in FIG. 16, the control unit 58 controls the upstream transport roller pair 35 and the recording head 22 to repeat the transport of the medium M in the D1 direction by the transport amount FA by the upstream transport roller pair 35 and the stopping of the transport, and the discharge of the ink while the recording head 22 reciprocates in the Y-axis direction, and thus to record the image P on the first surface S1 of the medium M.

Figure 17:
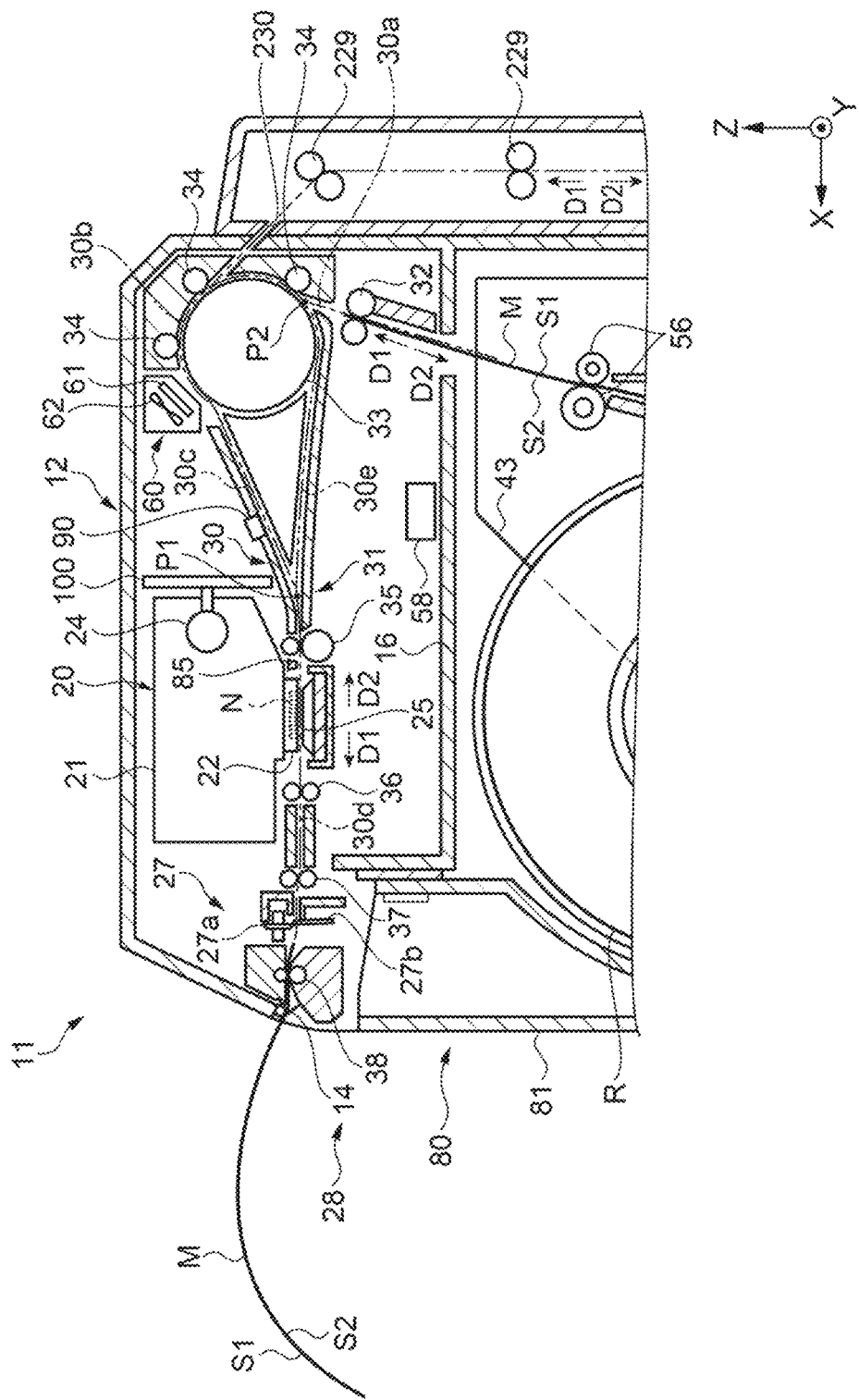
FIG. 17 is a schematic view illustrating the control method of the recording device.

Then, as illustrated in FIG. 17, the control unit 58 controls the cutting unit 27 to cut the region of the medium M on the leading end side in which the image P is recorded to a predetermined length. When recording is performed on the second surface S2 of the medium M cut into a cut sheet of a predetermined length, the control unit 58 controls the upstream transport roller pair 35, the intermediate roller 33, the feed roller pair 32, and the roll of paper transport roller pair 56 to transport the medium M in which the region on the leading end side on which the image P is recorded has been cut in the D2 direction. As illustrated in FIG. 17, the leading end of the medium M transported in the D2 direction is transported to a position located upstream in the D1 direction from the first path 30a.

Then, the control unit 58 controls the downstream third transport roller pair 38, the upstream transport roller pair 35, and the intermediate roller 33 to transport the medium M cut into the cut sheet of a predetermined length in the D2 direction, and to cause the medium to enter the curved path 30b via the third path 30d and the inversion path 30e. Then, the control unit 58 controls the intermediate roller 33, the upstream transport roller pair 35, and the recording head 22 to record the image P on the second surface S2 of the medium M, similarly to the case in which the image P is recorded on the second surface S2 of the medium M1. Then, the control unit 58 controls the upstream transport roller pair 35 and the downstream third transport roller pair 38 to transport the medium M in the D1 direction, and to discharge the cut sheet-like medium M from inside the recording unit 20 via the third path 30d and the discharge port 14.

As described above, according to the recording device and the control method of the recording device according to Embodiment 1, the effects below can be achieved.

The recording device 11 includes the upstream transport roller pair 35 capable of transporting the medium M1, a recording head 22 that records the image P by discharging ink at a predetermined timing, while moving in the Y-axis direction that intersects the D1 direction, on the medium M1 that is transported downstream in the D1 direction by a predetermined transport amount FA by the upstream transport roller pair 35, an image capturing unit 90 capable of reading the image P recorded on the medium M1 by the recording head 22, and a control unit 58, wherein the control unit 58 performs any one of the maintenance for the ink discharge failure, the correction of the transport amount FA, and the correction of the discharge timing of the ink based on the reading result of the image P read by the image capturing unit 90. Thus, the frequency of confirming the image P recorded on the medium M1 by the user and performing maintenance for the recording device 11 can be reduced. Furthermore, the maintenance for the recording device 11 such as the correction of the transport amount FA, the correction of the discharge timing of the ink, and the like in accordance with the usage environment of the user can be performed.

The control unit 58 controls the upstream transport roller pair 35 and the recording head 22 to record, as the image P, the confirmation pattern CP including at least two of the patterns Pa, Pb, Pc, and Pd for confirming the ink discharge state, the patterns Pf1 and Pf2 for confirming the transport amount FA, and the patterns Ps1 and Ps2 for confirming the discharge timing on the medium M1, controls the image capturing unit 90 to read the confirmation pattern CP recorded on the medium M1, and performs at least two of the maintenance for the discharge failure, the correction of the transport amount FA, and the correction of the discharge timing based on the reading result of the confirmation pattern CP read by the image capturing unit 90 In this way, since the recording device 11 performs recording of the confirmation pattern CP and reads the recorded confirmation pattern CP, it is unnecessary for the user to cause the image capturing unit 90 to read the confirmation pattern CP when the maintenance for the recording device 11 is performed.

The image capturing unit 90 is provided in the recording unit 20 including the upstream transport roller pair 35 and the recording head 22. Thus, a size of the recording device 11 can be reduced.

The image capturing unit 90 is provided upstream of the recording head 22 in the D1 direction, and the control unit 58 controls the upstream transport roller pair 35 and the recording head 22 to record the confirmation pattern CP on the medium M1 transported downstream in the D1 direction, and controls the upstream transport roller pair 35 and the image capturing unit 90 to transport the medium M1 on which the confirmation pattern CP is recorded toward the upstream in the D1 direction and to read the confirmation pattern CP with the image capturing unit 90. Thus, it is possible to efficiently perform the recording of the confirmation pattern CP and the reading of the recorded confirmation pattern CP. Additionally, the transport of the medium M1 in the recording of the confirmation pattern CP and the reading of the confirmation pattern CP can be performed by the upstream transport roller pair 35 having a high transport accuracy.

The recording device 11 includes the downstream third transport roller pair 38, which discharges the medium M1 from inside the recording unit 20, located downstream of the recording head 22 in the D1 direction, and the medium M1 read by the image capturing unit 90 and transported downstream in the D1 direction by the upstream transport roller pair 35 can be discharged from inside the recording unit 20 by the downstream third transport roller pair 38. Thus, the medium M1 that has been read by the image capturing unit 90 can be discharged out of the recording device 11.

The confirmation pattern CP is recorded on the end side upstream in the D1 direction from the center of the medium M1 in the D1 direction. Thus, the confirmation pattern CP can be efficiently read by the image capturing unit 90.

The confirmation pattern CP is recorded on the medium M1 by discharging ink while the recording head 22 reciprocates once in the Y-axis direction. Thus, the confirmation pattern CP can be efficiently recorded.

The patterns Ps1 and Ps2 for confirming the discharge timing are recorded in the center of the medium M1 in the Y-axis direction. Thus, it is possible to improve the accuracy of correcting the discharge timing of the ink based on the reading result of the patterns Ps1 and Ps2.

When determining that the maintenance for the discharge failure is necessary from the reading result from the image capturing unit 90, the control unit 58 does not perform the correction even when it is determined that any one of the correction of the transport amount FA and the correction of the discharge timing is necessary. Thus, it is possible to reduce the frequency at which the correction of the transport amount FA and the correction of the discharge timing of the ink with low accuracy are performed.

Before any one of the maintenance for the discharge failure, the correction of the transport amount FA, and the correction of the discharge timing is performed based on the reading result from the image capturing unit 90, the control unit 58 confirms with the user whether or not it is possible to perform the one. Thus, any one of the maintenance and correction according to the user's wish can be performed.

The control method of the recording device is a control method of the recording device 11 in which the image P is recorded by discharging ink on the medium M1, wherein the image P is recorded by discharging ink at a predetermined timing on the medium M1 transported by a predetermined transport amount FA in the D1 direction while moving in the Y-axis direction intersecting the D1 direction, and any one of the maintenance for ink discharge failure, the correction of the transport amount FA, and the correction of the discharge timing of the ink is performed based on the reading result of the image P read from the image P recorded on the medium M1. Thus, the user can confirm the image P recorded on the medium M1 and can reduce the frequency of the maintenance for the recording device 11.

In the control method of the recording device, the confirmation pattern CP including as least two of the patterns Pa, Pb, Pc, and Pd for confirming the ink discharge state, the patterns Pf1 and Pf2 for confirming the transport amount FA, and the patterns Ps1 and Ps2 for confirming the discharge timing is recorded as the image P on the medium M1, the confirmation pattern CP recorded on the medium M1 is read, and at least two of the maintenance for the discharge failure, the correction of the transport amount FA, and the correction of the discharge timing are performed based on the reading result of the confirmation pattern CP read from the confirmation pattern CP. Thus, since the recording device 11 performs recording of the confirmation pattern CP and reads the recorded confirmation pattern CP, it is unnecessary for the user to cause the image capturing unit 90 to read the confirmation pattern CP when the maintenance of the recording device 11 is performed.

Although the recording device and the control method of the recording device according to the above embodiment of the present disclosure are based on having the configuration as described above, it is also possible to change or omit partial configuration without departing from the gist of the present disclosure. Also, the above embodiment and other embodiments described below can be combined with each other within a technically consistent range. Other embodiments will be described below.

In the above embodiment, the image capturing unit 90 may not be disposed between the curved path 30*b* and the recording head 22 in the transport path 30. For example, the image capturing unit 90 may be provided downstream of the recording head 22 in the D1 direction in the third path 30*d*. Alternatively, the image capturing unit 90 may be provided in the inversion path 30*e*.

In the above embodiment, the confirmation pattern CP may not be recorded in the region on the rear end side which is the end side located upstream in the D1 direction from the center of the medium M1. For example, the confirmation pattern CP may be recorded in a region on the leading end side which is the end side located downstream in the D1 direction from the center of the medium M1. Alternatively, the confirmation pattern CP may be recorded in a central region of the medium M1 in the D1 direction.

In the above embodiment, the confirmation pattern CP may not be recorded on the medium M, M1 by discharging ink from the nozzles N while the recording head 22 reciprocates once in the SD1 direction and the SD2 direction which are the Y-axis direction. In this case, the confirmation pattern CP may be recorded on the first surface S1 of the medium M, M1 by discharging ink from the nozzles N while the recording head 22 reciprocates multiple times in the SD1 direction and the SD2 direction which are the Y-axis direction.

In the above embodiment, the patterns Ps1 and Ps2 for confirming the discharge timing of the ink from the nozzles N in the recording head 22 may not be recorded in the center of the medium M1 in the Y-axis direction. In this case, the patterns Ps1 and Ps2 may be recorded in a region closer to the end of the medium M1 from the center of the medium M1 in the Y-axis direction.

In the above embodiment, when determining that any one of the correction of the transport amount FA and the correction of the discharge timing of the ink in the recording head 22 is necessary based on the reading result of the confirmation pattern CP read by the image capturing unit 90, the control unit 58 may perform any one of the correction of the transport amount FA and the correction of the discharge timing even when it is determined that the maintenance for the ink discharge failure in the recording head 22 is necessary. For example, the confirmation pattern CP recorded on the medium M1 is illustrated in FIG. 19. In this case, the control unit 58 determines that the discharge state of the nozzles Nb2, Nc7, and Nd6 is bad, but the discharge state of the nozzles Na1 to Na9 used to record the patterns Ps1, Ps2, Pf1, and Pf2 is normal. In this case, when it is determined that the maintenance for the ink discharge failure in the recording head 22 is necessary from the reading result of the read confirmation pattern CP, but it is also determined that any one of the correction of the transport amount FA and the correction of the discharge timing of the ink in the recording head 22 is necessary, the control unit 58 performs any one of the correction of the transport amount FA and the correction of the discharge timing.

What is claimed is:

1. A recording device comprising:
    a transport unit configured to transport a medium;
    a recording head configured to record an image by discharging a liquid at a predetermined timing on the medium while moving in a scanning direction intersecting the transport direction, the medium being transported downstream in a transport direction by a predetermined transport amount by the transport unit;
    a reading unit configured to read the image recorded on the medium by the recording head; and
    a control unit, wherein
    the control unit has a function of performing maintenance for a discharge failure of the liquid, a correction of the transport amount, and a correction of the discharge timing of the liquid based on a reading result of the image read by the reading unit,
    wherein, when determining that the maintenance for the discharge failure is necessary based on the reading result from reading unit, the control unit does not perform the correction even when determining that any one of the correction of the transport amount and the correction of the discharge timing is necessary.

2. The recording device according to claim 1, wherein the control unit is configured to record, as the image, a confirmation pattern including at least two of a pattern for confirming the discharge failure of the liquid, a pattern for confirming the transport amount, and a pattern for confirming the discharge timing on the medium by controlling the transport unit and the recording head,
    to read the confirmation pattern recorded on the medium by controlling the reading unit, and
    to perform at least two of the maintenance for the discharge failure, the correction of the transport amount, and the correction of the discharge timing based on a reading result of the confirmation pattern read by the reading unit.

3. The recording device according to claim 2, wherein the reading unit is provided in a recording unit including the transport unit and the recording head.

4. The recording device according to claim 3, wherein:
    the reading unit is provided upstream of the recording head in the transport direction, and
    the control unit is configured to record the confirmation pattern on the medium transported downstream in the transport direction by controlling the transport unit and the recording head, and to transport the medium, on which the confirmation pattern is recorded, upstream in the transport direction, and to read the confirmation pattern with the reading unit by controlling the transport unit and the reading unit.

5. The recording device according to claim 4, further comprising, downstream of the recording head in the transport direction, a discharge transport unit configured to discharge the medium from inside the recording unit, and
    the medium read by the reading unit and transported downstream in the transport direction by the transport unit is discharged from inside the recording unit by the discharge transport unit.

6. The recording device according to claim 2, wherein the confirmation pattern is recorded on an upstream end side of a center of the medium in the transport direction.

7. The recording device according to claim 2, wherein the confirmation pattern is recorded on the medium by the recording head discharging the liquid while reciprocates once in the scanning direction.

8. The recording device according to claim 2, wherein the pattern for confirming the discharge timing is recorded in a center of the medium in the scanning direction.

9. The recording device according to claim 1, wherein before performing any one of the maintenance for the discharge failure, the correction of the transport amount, and the correction of the discharge timing based on the reading result from the reading unit, the control unit confirms with a user whether to perform the one.

10. A control method of a recording device that records an image by discharging a liquid on a medium, the method comprising:
- recording the image on the medium transported by a predetermined transport amount in a transport direction by discharging the liquid at a predetermined timing while moving in a scanning direction intersecting the transport direction; and
- performing any one of maintenance for a discharge failure of the liquid, a correction of the transport amount, and a correction of the discharge timing of the liquid based on a reading result of the image read from the image recorded on the medium,
- wherein, when determining that the maintenance for the discharge failure is necessary based on the reading result from reading unit, not performing the correction even when determining that any one of the correction of the transport amount and the correction of the discharge timing is necessary.

11. The control method of the recording device according to claim 10, comprising:
- recording, as the image, a confirmation pattern including at least two of a pattern for confirming the discharge failure of the liquid, a pattern for confirming the transport amount, and a pattern for confirming the discharge timing on the medium;
- reading the confirmation pattern recorded on the medium; and
- performing at least two of the maintenance for the discharge failure of the liquid, the correction of the transport amount, and the correction of the discharge timing based on a reading result of the confirmation pattern read from the confirmation pattern.

* * * * *